(12) United States Patent
Nakamura

(10) Patent No.: US 6,496,829 B1
(45) Date of Patent: Dec. 17, 2002

(54) INFORMATION PROCESSING APPARATUS, INFORMATION PROCESSING METHOD, AND COMPUTER-READABLE STORAGE MEDIUM FOR STORING INFORMATION PROCESSING PROGRAM

(75) Inventor: Kazuhiro Nakamura, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/487,721

(22) Filed: Jan. 19, 2000

(30) Foreign Application Priority Data

Jan. 20, 1999 (JP) ............................................ 11-011322
Jan. 13, 2000 (JP) ........................................ 2000-004544

(51) Int. Cl.⁷ .............................................. G06F 17/30

(52) U.S. Cl. ...................... 707/10; 707/104; 707/501.1; 709/218

(58) Field of Search ............................... 707/10, 501.1, 707/104; 709/218, 203, 245; 345/744, 760; 713/1

(56) References Cited

U.S. PATENT DOCUMENTS 6,037,934 A * 3/2000 Himmel et al. ............. 345/760
6,041,360 A * 3/2000 Himmel et al. ................ 707/1
6,208,995 B1 * 3/2001 Himmel et al. ................ 706/6
6,211,871 B1 * 4/2001 Himmel et al. ............. 345/744

OTHER PUBLICATIONS

Michael Wynblatt and Dan Benson "Web page caricatures: Multimedia summaries for WWW documents", IEEE, 1998.*

* cited by examiner

*Primary Examiner*—Jean M. Corrielus
(74) *Attorney, Agent, or Firm*—Fitzpatrick, Cella, Harper & Scinto

(57) ABSTRACT

An information processing apparatus, method and program for managing a bookmark list in which URL information is registered that is used to access other information processing apparatuses in order to obtain desired information, comprising the steps of dividing the URL information into a plurality of items, assigning item numbers based on the location of each of the items in the URL information, and differentiating between the items in the URL information based on a desired item number and of registering the item in the bookmark list.

36 Claims, 19 Drawing Sheets http://www.seifu0.go.jp/
2101 2102 2103 2104 2105 http://www.abc.kaisha0.co.jp/
2111 2112 2113 2114 2115 2116 http://www.kaisha0.co.jp/
2106 2107 2108 2109 2110 http://www.kaisha0.co.jp/main/index.html
2117 2118 2119 2120 2121 2122 2123 2124

| | |
|---|---|
| go | http://www.seifu0.go.jp/ |
| | http://www.seifu1.go.jp/ |
| co | http://www.kaisha0.co.jp/ |
| | http://www.kaisha1.co.jp/ |
| | http://www.kaisha2.co.jp/ |
| or | http://www.sonota0.or.jp/ |

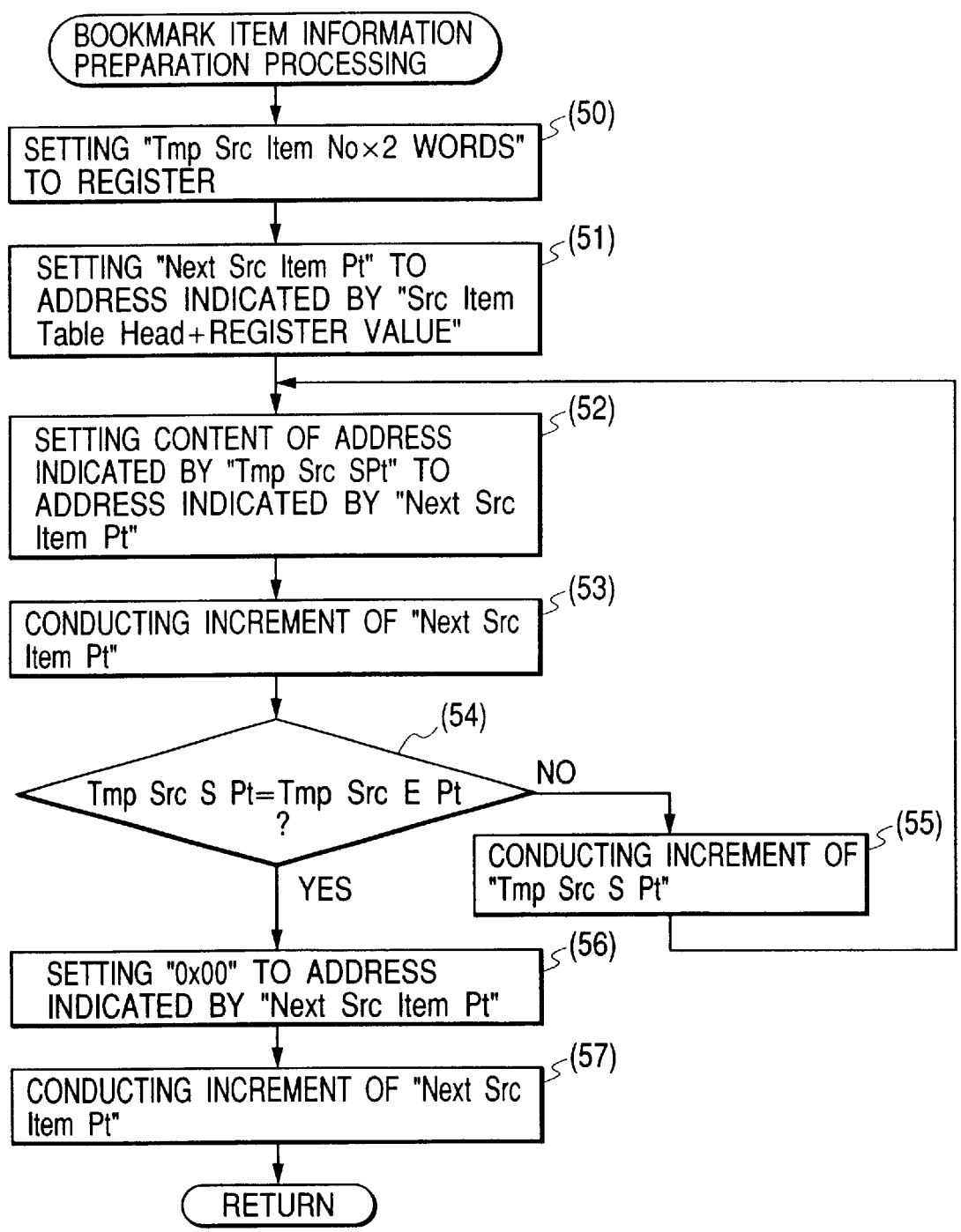

FIG. 20

STORAGE MEDIUM SUCH
AS FD/CD-ROM ETC.

| DIRECTORY INFORMATION |
|---|
| FIRST DATA PROCESSING PROGRAM GROUP OF PROGRAM CODES CORRESPONDING TO STEPS OF FLOW CHARTS SHOW IN FIGS. 8-19 |
| |

MEMORY MAP OF STORAGE MEDIUM

FIG. 21A   http://www.seifu0.go.jp/
           2101  2102  2103  2104 2105

FIG. 21B   http://www.kaisha0.co.jp/
           2106  2107  2108  2109 2110

FIG. 21C   http://www.abc.kaisha0.co.jp/
           2111  2112  2113  2114  2115 2116

FIG. 21D   http://www.kaisha0.co.jp/main/index.html
           2117  2118  2119  2120 2121 2122  2123  2124

INFORMATION PROCESSING APPARATUS, INFORMATION PROCESSING METHOD, AND COMPUTER-READABLE STORAGE MEDIUM FOR STORING INFORMATION PROCESSING PROGRAM

BACKGROUND OF THE INVENTION

1. Field of the Invention

The present invention relates to an information processing apparatus and an information processing method, for using a Web browser to access another information processing apparatus based on a desired URL (Uniform Resource Locator), and for referring to and obtaining desired information; and also relates to a computer-readable storage medium on which an information processing program is stored.

2. Related Background Art

Conventionally, a list of bookmark data, which is used with an information processing apparatus having a Web browser function, is constituted by arranging desired reference destinations in accordance with specific contents, or by arranging reference destinations in the order in which bookmarks are added to the bookmark list or in the alphabetical order of title information or URLs.

But although the order in which data are added or the alphabetical order of titles can constitute search indicators, it is difficult for a user to remember exactly when a desired bookmark was added or what its exact title is, and thus it is difficult to use this information to extract a specific bookmark from a long list. As a result, to perform a search for a desired bookmark, a user must often start at the very beginning of a bookmark list.

Furthermore, when URLs are merely arranged in alphabetical order, such an arrangement will not satisfy the needs of an operator. So to resolve these problems, a user must deliberately re-construct a bookmark data file. And for a user who has on hand an enormous amount of bookmark data, this is very inconvenient and complicated process.

SUMMARY OF THE INVENTION

To resolve the above shortcomings, it is one objective of the present invention to provide an information processing apparatus wherein, when a user designates an item number to be used to identify (or discriminate) bookmark data and subsequently adds a bookmark to the bookmark data, the bookmark data are automatically identified (or discriminated) and managed in accordance with the designated item number so that the bookmarks are managed not merely in accordance with a data arrangement; and to provide an information processing method for bookmark management and a computer-readable storage medium in which is stored an information processing program for the processing method. It is another objective of the present invention to provide an information processing apparatus wherein to express a preference an operator can deliberately designate an item number so that the desire of the operator is reflected in the management of bookmarks; and to also provide an information processing method for bookmark management and a computer-readable storage medium in which an information processing program for the processing method is stored.

To achieve the above objectives, according to the present invention, provided is an information processing apparatus and an information processing method, or an information processing program, for managing a bookmark list in which URL information is registered that is used to access other information processing apparatuses in order to obtain desired information, comprising:

a division step of dividing the URL information into a plurality of items;

an assignment step of assigning item numbers based on the location of each of the items in the URL information; and a discrimination step of differentiating between the items in the URL information based on a desired item number and of registering the item in the bookmark list.

A sub-item that represents the type of assigned item in storage means that is stored for each item number.

Preferably, for items that represent domain names, the item numbers are assigned beginning with the last item.

The processing is initiated when an instruction is issued to register new URL information in the bookmark list.

A desired item number can be set.

A plurality of desired item numbers can be set.

It is preferable that the URL information be identified and registered in the bookmark list by employing an item number in consonance with the order in which numbers are allocated.

It is preferable, when a desired item number is set, that the registered URL information be identified and re-registered in the bookmark list.

The items may be protocol names or domain names.

The item s may include directory names.

The items in the URL information may consist of a character string that is delimited by a slash "/" and a dot ".".

The items may be genres or channel numbers for a Web TV.

According to the present invention, since the bookmark data are automatically discriminated between and managed in accordance with an item number designated by a user, the management of the bookmarks is not based on a mere arrangement of data.

In addition, since a discriminating designation of a desired item number can be made by an operator, the intent of the operator can be reflected in the management of the bookmarks.

Furthermore, since item numbers are allocated beginning with the last of the items in domain names, systematic discrimination between and management of bookmarks can be provided.

Other features and advantages of the invention will become apparent during the course of the following description given while referring to the accompanying drawings, throughout which the same reference characters are employed to designate like or similar parts.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 15 is a flowchart showing the bookmark item information preparation processing performed in FIG. 13;

FIG. 20 is a diagram for explaining the memory map for a storage medium in which are stored various data processing programs that can be read by the information processing apparatus of the invention.

FIGS. 21A, 21B, 21C and 21D are diagrams showing example URLs; and

DETAILED DESCRIPTION OF THE PREFERRED EMBODIMENT

Figure 1:
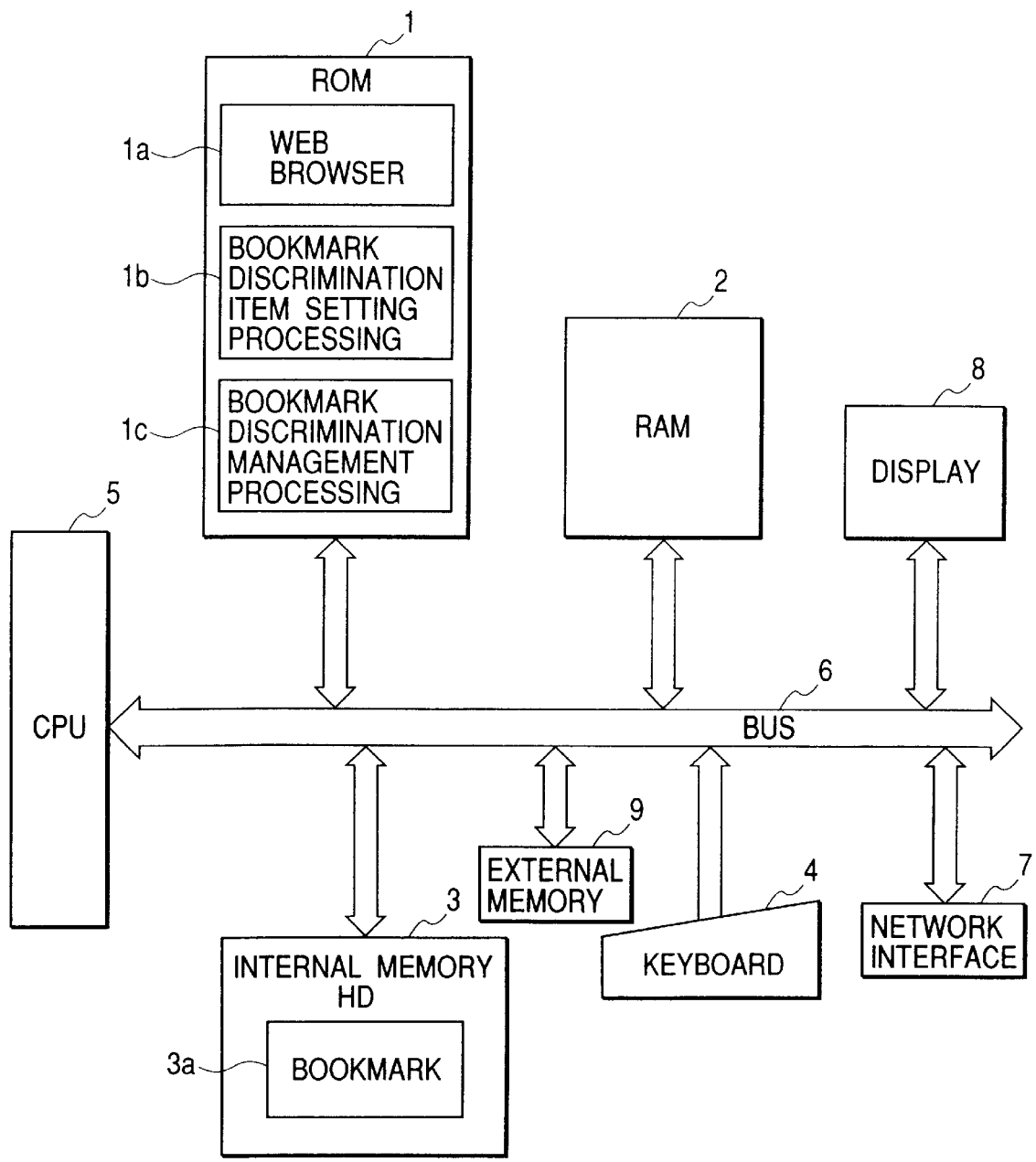
FIG. 1 is a block diagram illustrating one example system configuration of an information processing apparatus according to one embodiment of the present invention.

FIG. 1 is a block diagram illustrating an example system configuration of an information processing apparatus according to one embodiment of the present invention.

In FIG. 1, a read only memory (ROM) 1 is connected via a bus 6 to a central processing unit (CPU) 5 that controls the overall system of the information processing apparatus. Stored in the ROM 1 are programs for controlling the CPU 5: a Web browser program 1a, a program 1b for the bookmark discrimination item setting processing, and a program 1c for the bookmark discrimination management processing.

A random access memory (RAM) 2 is used to temporarily store information required for the system processing. Processing information for the information processing apparatus and work areas used by the CPU 5 are stored in the RAM 2. An internal memory 3 is constituted by a hard disk (HD) that is used to store a bookmark 3a that is employed by the Web browser 1a. A keyboard 4 is used to enter a user's instructions, such as a setting instruction. A network interface 7 is used to connect to the Internet via a telephone line or a LAN. The information processing apparatus communicates with an external device via the network interface 7. A display unit 8 displays a bookmark or other obtained information. An external memory 9 is a removable media control device, such as a floppy disk, a CD-ROM or a flash memory. From the ROM 1, the HD 3 or the external storage medium, the CPU 5 can read data and a program that it executes.

Figure 22:
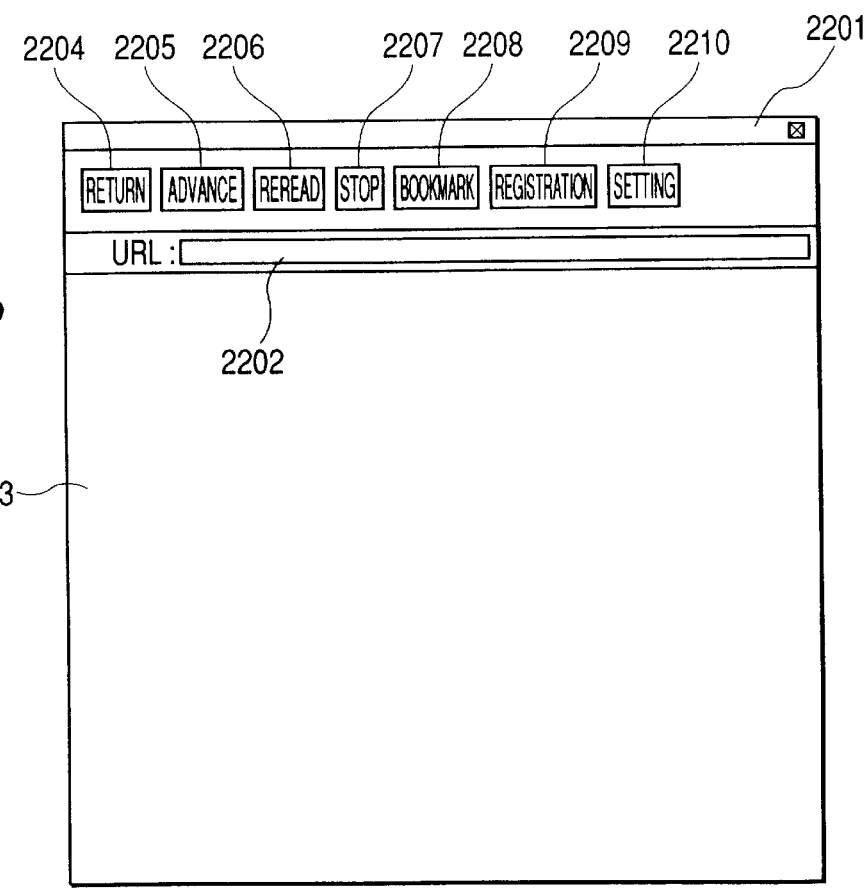
FIG. 22 is a diagram showing an example display screen for a Web browser.

The CPU 5 employs the Web browser program 1a to display a screen 2201, shown in FIG. 22, on the display unit 8. The Web browser for this embodiment that is shown in FIG. 22 includes: the browser window 2201; a URL display column 2202, for displaying the URL source of the information that is referred to; an information display column 2203, for displaying the information that is referred to; a return button 2204, for displaying preceding information; an advance button 2205, for displaying succeeding information; a re-read button 2206, for rereading the URL information that is being referred to; a stop button 2207, for halting the reading of current information; a bookmark button 2208, for displaying a bookmark list in which the URL is registered; a registration button 2209, for registering the URL in a bookmark list; and a setting button 2210, for setting an item number, a display or a network.

Figure 2:
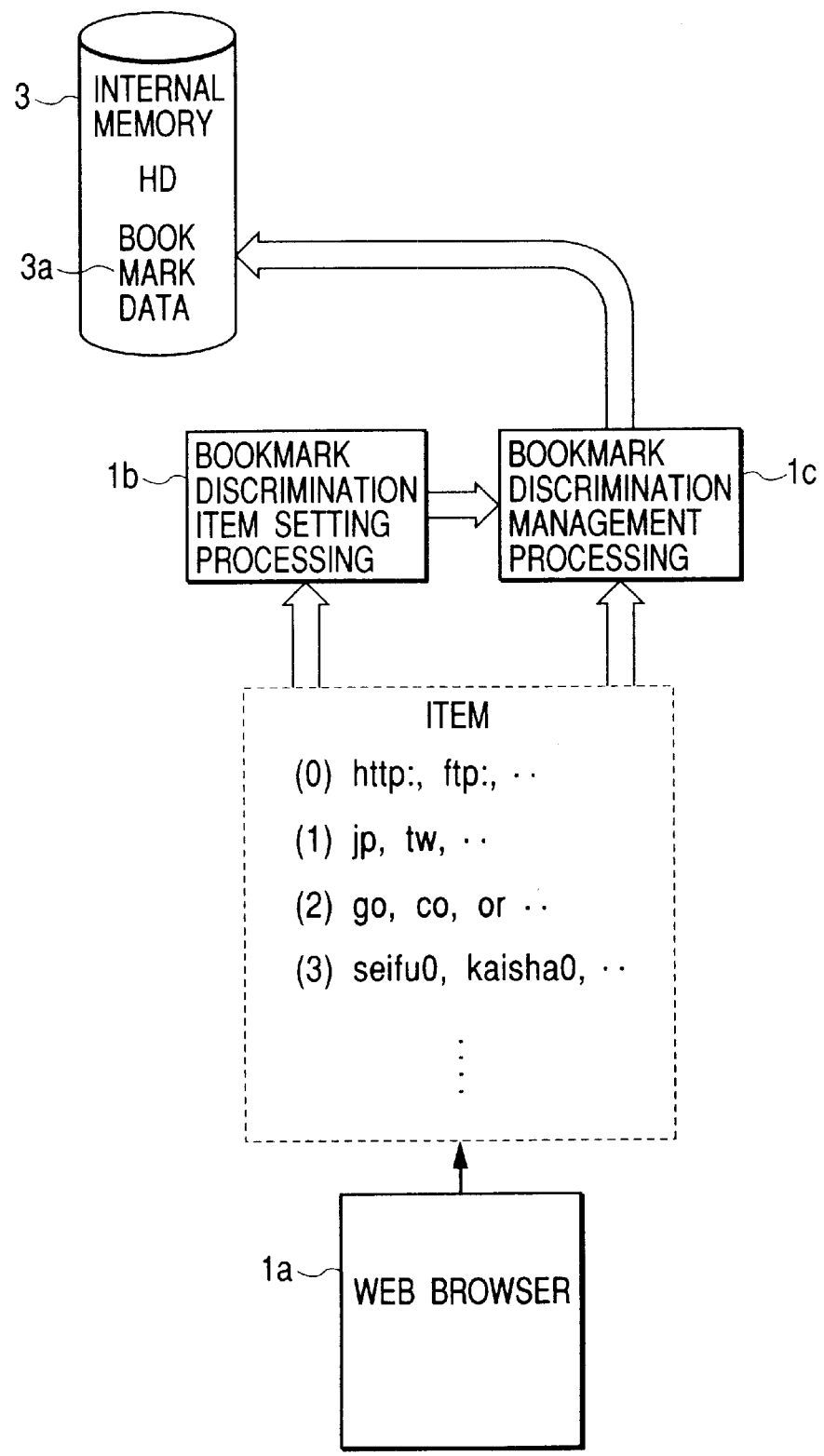
FIG. 2 is a block diagram for explaining the data processing performed by the information processing apparatus in FIG. 1.

FIG. 2 is a block diagram for explaining the data processing performed by the information processing apparatus in FIG. 1. The same reference numerals are used to denote corresponding components.

In FIG. 2, the information processing apparatus of this embodiment includes the internal memory that is constituted by a hard disk, and the bookmark data 3a used by the Web browser 1a that are stored in it. The bookmark discrimination item setting program 1b performs the processing for setting items to discriminate between the bookmark data 3a, based on the URL that is used by the Web browser 1a. The bookmark discrimination management program 1c automatically discriminates between the bookmark data 3a, based on the items set by the bookmark discrimination item setting program 1b, and manages a bookmark list.

In this embodiment, in the URL used by the Web browser 1a, character strings (elements) that are delimited by a slash "/" and/or a dot "." are defined as items used to discriminate between bookmarks. For the URL "http://www.seifu0.go.jp/" or "http://www.kaisha0.co.jp/", for example, items to be used to discriminate between the bookmarks are "http:", "jp", "go", "co", "seifu0", "kaisha" and "www". In accordance with the positions occupied by the items in the URL, numbers (0) to (4) are used to identify them. Among the items thus identified, various data types are called sub-items, and an item number that is selected to discriminate between bookmarks is specifically called a target item number. In this embodiment, the bookmarks are automatically discriminated between based on the sub-item that belongs to the target item number.

FIGS. 21A to 21D are diagrams showing example URLs that are to be registered, and items 2101 to 2124 are character strings that are delimited by a slash "/" and/or a dot ".". The first item, 2101, 2106, 2111 and 2117, of each URL represents a protocol name, and the items 2102 to 2105, 2107 to 2110, 2112 to 2116 and 2118 to 2121, which are delimited by a leading slash "/" and a trailing slash "/" represent the domain names of information processing apparatuses that are to be accessed. The following items 2122, 2123 and 2124 represent an information directory that is to be referred to, or the information itself.

For the provision of item numbers, item number (0) is allocated to item 2101, 2106, 2111 or 2117, which represents a protocol name. Normally, among the items 2102 to 2105, 2107 to 2110, 2112 to 2116 or 2118 to 2121, which represent a domain name, the item 2105, 2110, 2116 or 2121, which represents the country that manages the domain name, is located at the end; the item 2104, 2109, 2115 or 2120, for a subdomain that represents an attribute, it located immediately preceding the end position; the item 2103, 2108, 2114 or 2119, for a subdomain that represents and organization, is located at the third position from the end; and the item 2102, 2107, 2112 or 2118, for a subdomain used to identify an information processing apparatus, is located at the fourth position from the end. Therefore, item numbers are allocated beginning with the last item. That is, item number (1) is assigned to the item 2105, 2110, 2116 or 2121 that represents the country; item number (2) is allocated for the item 2104, 2109, 2115 or 2120 that represents the attribute; item number (3) is assigned to the item 2103, 2108, 2114 or 2119 that represents the organizations; item number (4) is assigned to the item 2102, 2107, 2112 or 2119 that precedes item number (3); and item number (5) is assigned to the item 2118 that precedes item number (4). It is preferable that item numbers of another type be assigned to the items 2122 to 2124 that represent a directory or information to be referred to. That is, item number (A1) is assigned to item 2122, item number (A2) is assigned to item 2123, and item number (A3) is assigned to item 2124.

In the thus arranged information processing apparatus, when the Web browser program 1*a*, which is one of the processes stored in the ROM 1 for the CPU 5, is activated, the bookmark discrimination item setting program 1*b* and the bookmark discrimination management program 1*c* are activated and the work areas are obtained in the RAM 2. According to the bookmark discrimination item setting program 1*b*, a target item number used for bookmark discrimination is set by a key entry at the keyboard 4. According to the bookmark discrimination management program 1*c*, the bookmark data 3*a* that are added and updated each time are discriminated between and managed based on the target item number set by the program 1*b*. It should be noted that such information is exchanged by the individual devices via the bus 6.

Figure 3:
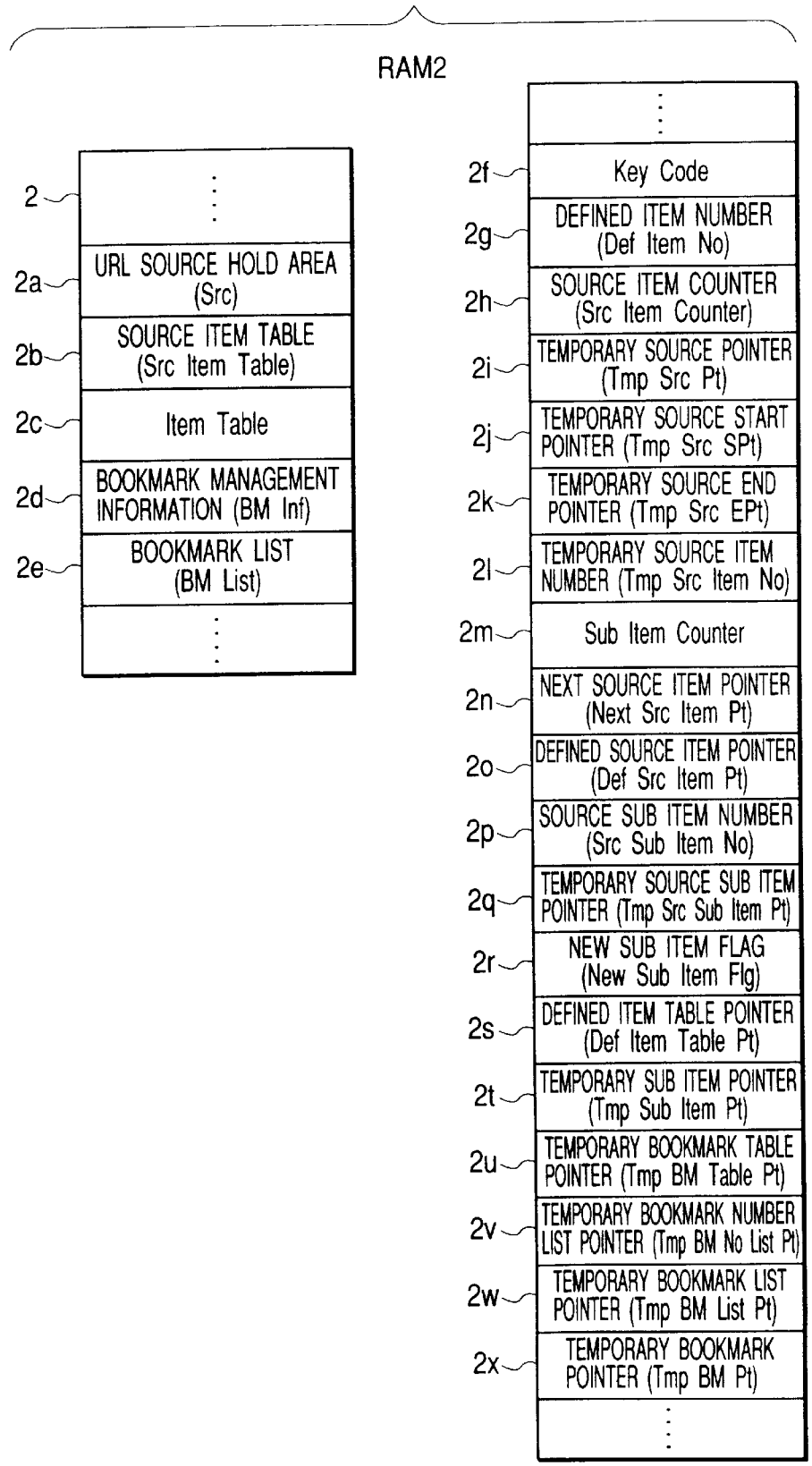
FIG. 3 is a specific diagram for explaining the arrangement of work areas in a RAM shown in FIG. 1.

FIG. 3 is a specific diagram for explaining the arrangement of the work areas in the RAM 2 shown in FIG. 1.

In FIG. 3 a URL source hold area (Src) 2*a* is used for the temporary storage of URL information that is employed by the Web browser program 1*a* to designate the location of information that is to be referred to.

A source item table (Src Item Table) 2*b* is an area wherein, for each item, the elements of the URL information stored in the URL source hold area 2 are sorted and held.

An item table (Item Table) 2*c* is an area wherein sub-items, which represent the data types of items obtained when the URL information is sorted for individual item numbers, are stored in a dictionary form.

A bookmark management information area (BM Inf) 2*d* is an area wherein management information is stored for the bookmark data 3*a* that are used by the Web browser program 1*a*.

A bookmark list (BM List) 2*e* is used to store, as a list, bookmark data and pointers to the data.

A key code area (Key Code) 2*f* is an area wherein data entered at the keyboard 4 is stored.

A defined item number area (Def Item No) 2*f* is an area wherein a target item that is selected by a user is stored as a number.

A work area 2*f* and the following work areas are used for the individual processes in this embodiment, and only the names and reference symbols for them are provided below:

a source item counter (Src Item Counter) 2*h*;

a temporary source pointer (Tmp Src Pt) 2*i*;

a temporary source start pointer (Tmp Src SPt) 2*j*;

a temporary source end pointer (Tmp Src EPt) 2*k*;

a temporary source item number (Tmp Src Item No) 2*l*;

a sub-item counter (Sub Item Counter) 2*m*;

a next source item pointer (Next Src Item Pt) 2*n*;

a defined source item pointer (Def Src Item Pt) 2*o*;

a source sub-item number (Src Sub Item No) 2*p*;

a temporary source sub-item pointer (Tmp Src Sub Item Pt) 2*q*;

a new sub-item flag (New Sub Item Flg) 2*r*, which is turned on when registration of a new sub-item is required because a bookmark has been added;

a defined item table pointer (Def Item Table Pt) 2*s*;

a temporary sub-item pointer (Tmp Sub Item Pt) 2*t*;

a temporary bookmark table pointer (Tmp BM Table Pt) 2*u*;

a temporary bookmark number list pointer (Tmp BM No List Pt) 2*v*;

a temporary bookmark list pointer (Tmp BM List Pt) 2*w*; and a temporary bookmark pointer (Tmp BM Pt) 2*x*.

The URL source hold area 2*a*, the source item table 2*b*, the item table 2*c*, the bookmark management information area 2*d*, and the bookmark list 2*e* will be described in detail while referring to FIGS. 4 to 7.

Figure 4:
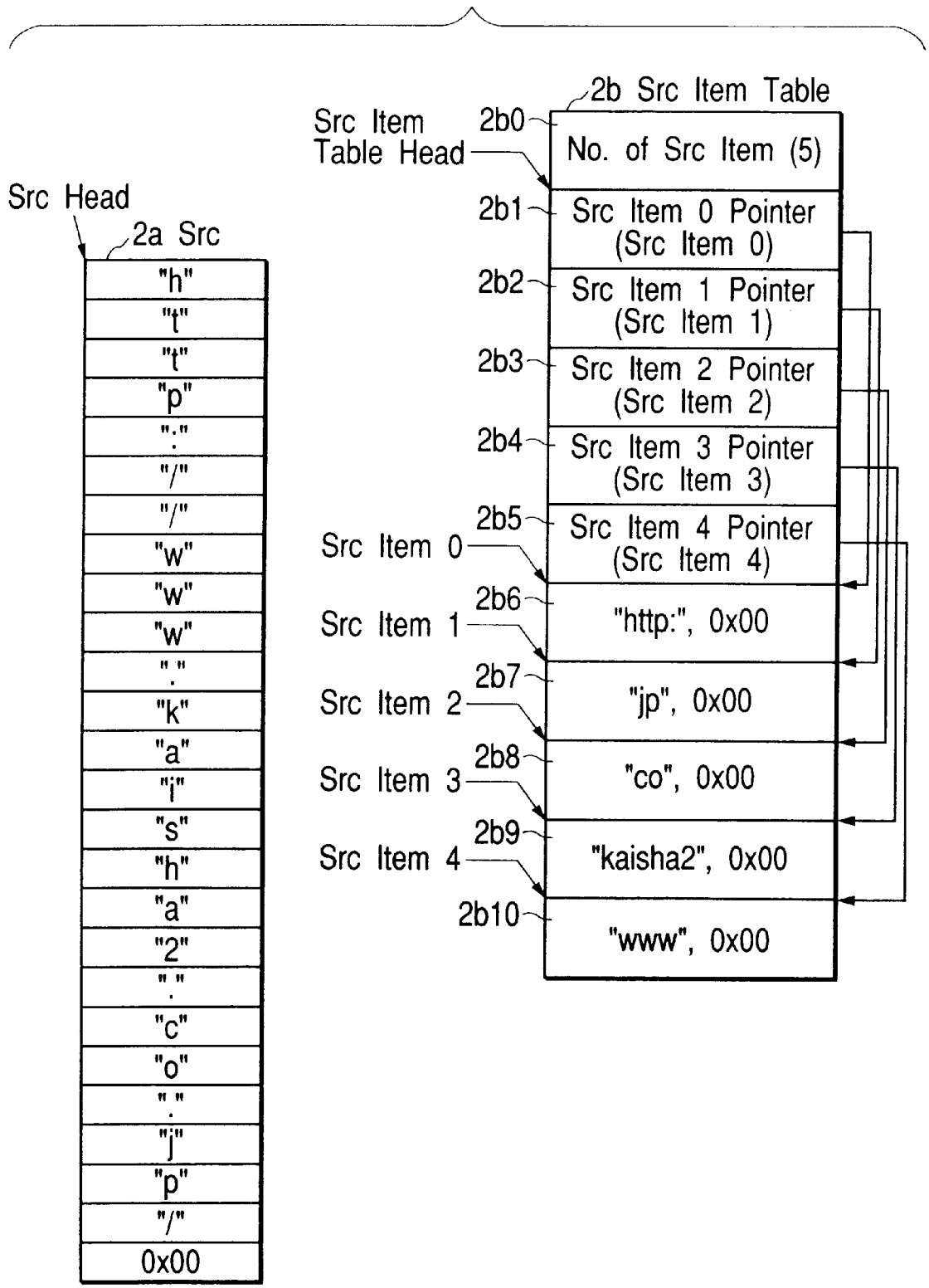
FIG. 4 is a specific diagram for explaining a URL source holding area and a source item table in the RAM in FIG. 3.

FIG. 4 is a specific diagram for explaining the arrangement of the URL source hold area 2*a* and the source item table 2*b* located in the RAM 2 in FIG. 3.

In FIG. 4, the URL source hold area (Src) 2*a* is an area wherein URL information, used by the Web browser 1*a* to designate the location of information to be referred to, is temporarily stored. Beginning at the first address Src Head, the URL information "http://www.kaisha2.co.jp/" is stored in order, until finally, a code "0x00", which marks the end of the data, is stored. These data serve as source data for the bookmark data 3*a*, which will be described later.

The source item table (Src Item Table) 2*b* is an area wherein, for each item, the elements of the URL information, which are stored in the URL source hold area 2*a*, are sorted and held. The number of items (No. of Src Item) 2*b*0 is stored as a single byte immediately before the address occupied by Src Item Table Head. Thereafter, pointer (Src Item 0 Pointer) 2*b*1 to pointer (Src Item 4 Pointer) 2*b*5, for each of which two words are allocated to hold the data address for a sorted item, are sequentially stored. Then, the data "http:", "www", "kaisha2", "co" and "jp" for the item are stored at data positions Src Item 0 (2*b*6) to Src Item 4 (2*b*10), which are pointed to by the pointers. Finally, code "0x00" is entered to mark the end of the data that are stored.

Figure 5:
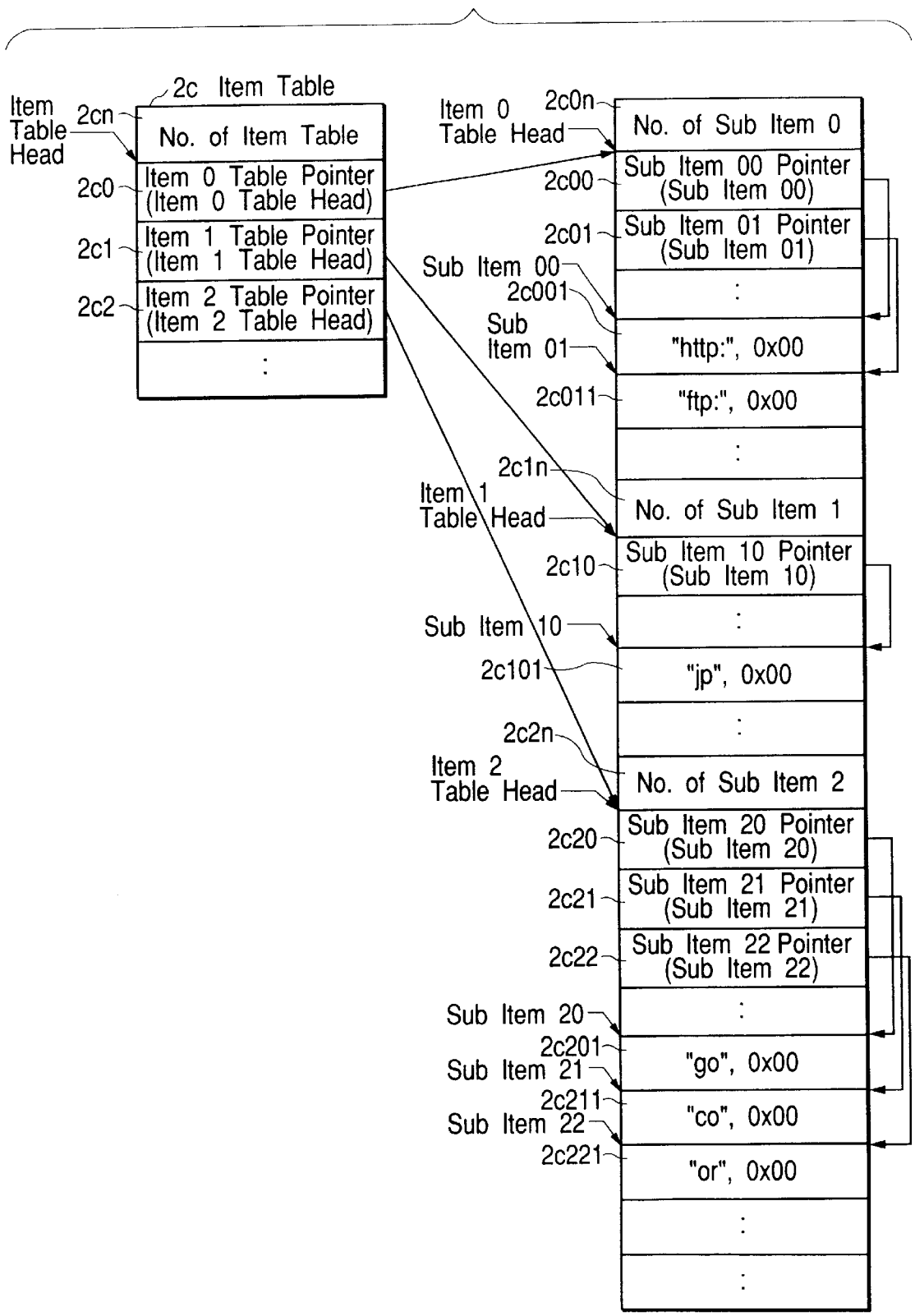
FIG. 5 is a specific diagram for explaining the arrangement of an item table in the RAM in FIG. 3.

FIG. 5 is a specific diagram for explaining the arrangement of areas in the item table (Item Table) 2*c* located in the RAM 2 in FIG. 3.

In FIG. 5. the item table (Item Table) 2*c* is an area wherein sub-items, which represent a variety of data types, of items are stored in a dictionary form when the URL information for each item number is sorted.

The item table (Item Table) 2*c* is prepared in advance as a dictionary of sub-items for individual items. When a new item and a sub-item are identified by the registration of a bookmark, the item table is updated by adding the new item.

The number of items (No. of Item Table) 2cn is stored in a single byte immediately before the address occupied by Item Table Head. Thereafter, a pointer (Item 0 Table Pointer) 2c0, a pointer (Item 1 Table Pointer) 2c1, and a pointer (Item 2 Table Pointer) 2c2, for each of which two words are allocated and which point to the sub-item table location of each item, are stored. An explanation for them will be given by using an example.

For example, the sub-item table for the second item is pointed to by the pointer (Item 2 Table Pointer) 2c2 in the item table 2c. The number of sub-items (No. of Sub Item 2) 2c2n is stored in a single byte immediately before the address occupied by the Item 2 table Head of the pointer sub-item table. Thereafter, a pointer (Sub Item 20 Pointer) 2c20, a pointer (Sub Item 21 Pointer) 2c21, and a pointer (Sub Item 22 Pointer) 2c22, each of which points to the sub-item data location, . . . are stored.

Then, code "0x00" that marks the end of the data is added to the sub-item data "go" 2c201, "co" 2c211, "or" 2c221, . . . of the second item, and these sub-item data are stored in sub-item data locations Sub Item 20, Sub Item 21, Sub Item 22, . . . that are pointed to by the sub-item pointers. The data are likewise stored for each item.

Figure 6:
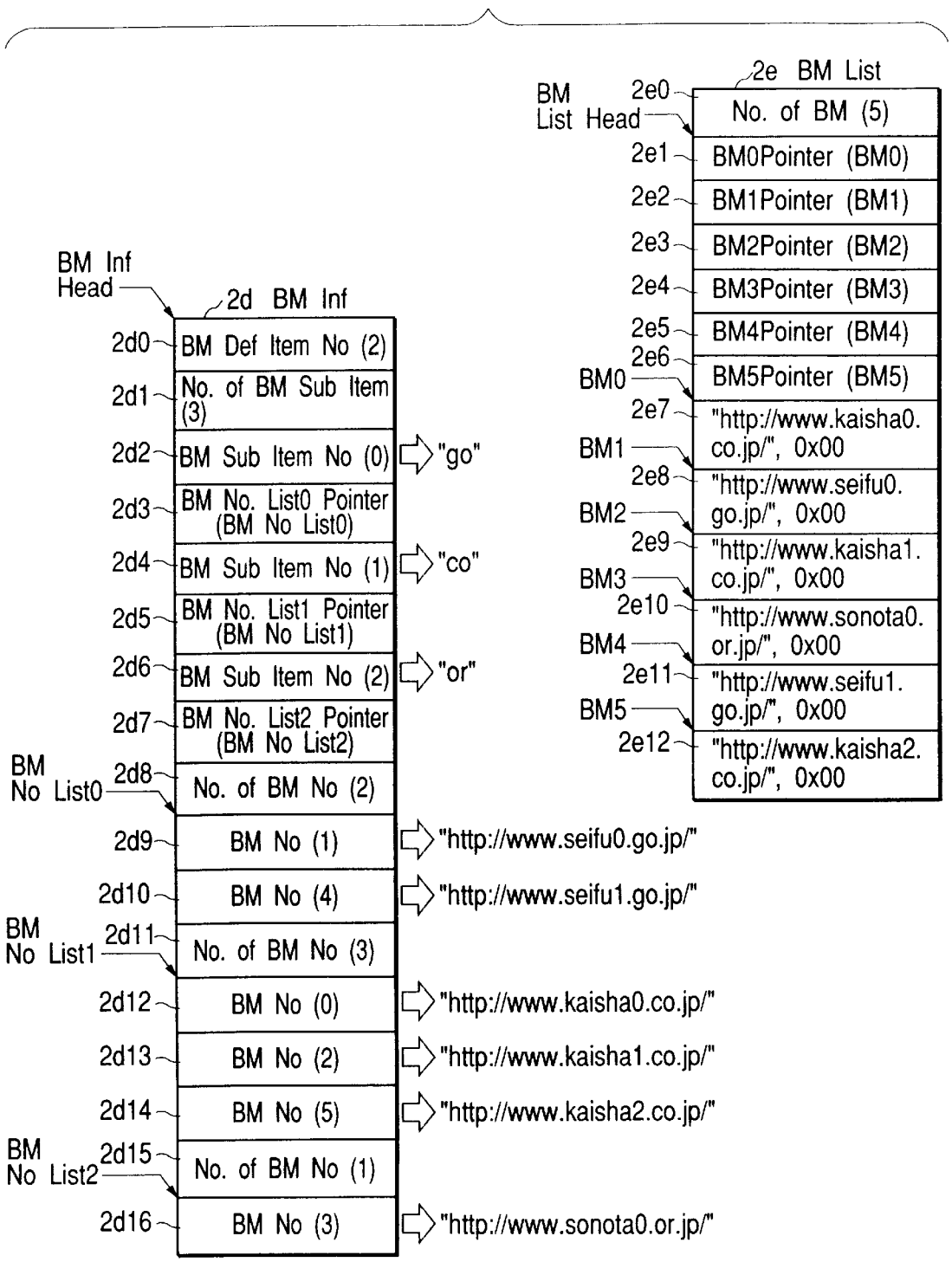
FIG. 6 is a specific diagram for explaining the arrangement of a bookmark management table and a bookmark list in the RAM in FIG. 3.

FIG. 6 is a specific diagram for explaining the arrangement of the bookmark management information area (BM Inf) 2d and the bookmark list (BM List) 2e that are located in the RAM 2 in FIG. 3.

In FIG. 6, the bookmark management information area (BM Inf) 2d is an area within which data are stored for the management of the bookmark data 3a that are employed by the Web browser program 1a.

In this embodiment, data in the bookmark management information area (BM Inf) 2d are very important to the display and management of the bookmark data 3a. With "BM Inf Head" occupying the head address, stored following it are a target item number (BM Def Item No) 2d0, which is selected as an item to discriminate between bookmarks, and the number of sub-items (No. of BM Sub Item) 2d1 for the target item. Thereafter, stored for each sub-item are: BM Sub Item No 2d2, 2d4, 2d6, . . . , each of which include the number of a sub-item in the item table (Item Table) in FIG. 5; and pointers (BM No List Pointer) 2d3, 2d5, 2d7, for each of which two words is allocated, that point to a location in the list of bookmark numbers that belongs to individual sub-items discriminated between in accordance with the pertinent item.

The number of bookmarks (No. of BM No) 2d8, 2d11, 2d15, . . . is stored in a single byte positioned immediately before the designated address "BM No List", and thereafter, bookmark numbers (BM No) 2d9, 2d10, 2d12, 2d13, 2d14, 2d15, 1d16, . . . are stored, which are included in the bookmark list (BM List) that will be described later.

Suppose that bookmark data are discriminated between and managed by defining the target item number (BM Def Item No) 2d0 as "2". Since, as is apparent from the item table (Item Table) in FIG. 5, the sub-items of target item number "2" are "go", "co" and "or", a "3" is entered in the number of sub-items (No. of BM Sub Item) 2d1. While the sub-item number (BM Sub Item No) for "go" is defined as "0" (2d2), the sub-item number (BM Sub Item No) of "co" is defined as "1" (2d4), and the sub-item number (BM Sub Item No) of "or" is defined as "2" (2d6), the pointers (BM No List Pointers) 2d3, 2d5 and 2d7 of the list of bookmark numbers are stored for the individual sub-items.

The number of bookmarks (No. of BM No) 2d8 in the list of bookmark numbers that belong to sub-item "go" is "2", and currently, the bookmarks represented by the bookmark numbers (BM No) "1" (2d9) and "4" (2d10) have been identified. Specifically, as is apparent from the bookmark list that will be described later, the bookmark of bookmark number "1" is "http://www.seifu0.go.jp/", and the bookmark of bookmark number "4" is "http://www.seifu1.go.jp/".

The number of bookmarks (No. of BM No) 2d11 in the list of bookmark numbers that belong to sub-item "co" is "3", and currently, the bookmarks represented by the bookmark numbers (BM No) "0" (2d12), "2" (2d13) and "5" (2d14) have been identified. Specifically, as is apparent from the bookmark list that will be described later, the bookmark of bookmark number "0" is "http://www.kaisha0.co.jp/", the bookmark of bookmark number "2" is "http://www.kaisha1.co.jp/", and the bookmark of bookmark number "5" is "http://www.kaisha2.co.jp/".

The number of bookmarks (No. of BM No) 2d15 in the list of bookmark numbers that belong to sub-item "or" is "1", and currently, the bookmark represented by the bookmark number (BM No) "3" (2d16) has been identified. Specifically, as is apparent from the bookmark list that will be described later, the bookmark of bookmark number "3" is "http://www.sonota0.or.jp/".

Data for bookmarks and pointers to the data are entered in the bookmark list (BM List) 2e. The number of bookmarks (No. of BM) 2e0 is stored in a single byte positioned immediately before the address occupied by the BM List Head. Thereafter, sequentially stored are: pointers 2e1 to 2e6, for each of which two words are allocated and which point at the bookmark data location and the data (URL information) 2e7 to 2e12.

As for a bookmark for bookmark number "5", for example, the address whereat data are present is specified by the pointer (BM 5 Pointer) 2e6, and following the designated address BM5 (2e12), bookmark data (URL information) "http://www.kaisha2.co.jp" are stored and the code "0x00" that marks the end of the code is entered.

Figures 7, 8:
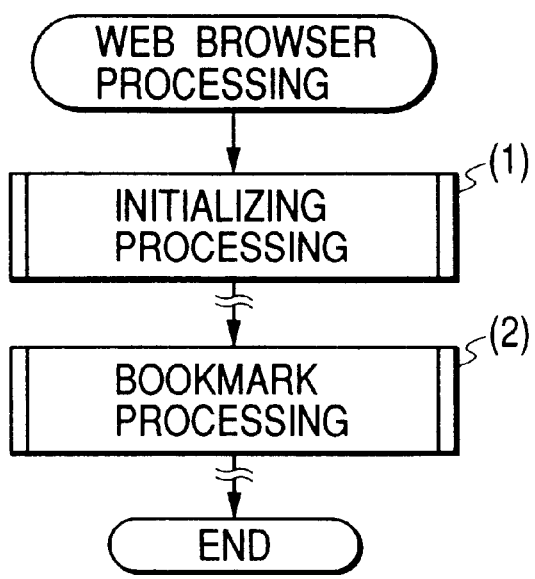
FIG. 7 is a specific diagram showing an example bookmark display that is prepared by the information processing apparatus in FIG. 1.
FIG. 8 is a flowchart showing example Web browser processing performed by the information processing apparatus of this invention.

FIG. 7 is a specific diagram showing an example display for a bookmark list that is prepared by the information processing apparatus in FIG. 1. In this example, the bookmark data 3a that are discriminated between and managed, with the target item number being "2", are displayed. This display is based on the bookmark management table BM Inf shown in FIG. 6.

In FIG. 7, there are three types of sub-items: "go", "co" and "or". Bookmarks that belong to sub-item "go" are "http://www.seifu0.go.jp/" and "http://www.seifu0.go.jp/"; bookmarks that belong to sub-item "co" are "http://www.kaisha0.co.jp/" and "http://www.kaisha1.co.jp/"; and a bookmark that belongs to sub-item "or" is "http://www.sonota0.or.jp/".

The operation performed by the information processing apparatus of the present invention will now be described in detail while referring to FIGS. 8 to 19.

FIG. 8 is a flowchart showing the Web browser processing performed by the information processing apparatus of this invention. The numbers (1) and (2) denote processing steps.

At step (1), initializing processing for work areas is performed, and at step (2), a conventional process, such as the reading of information corresponding to the URL, is performed. During this processing, the bookmark process that will be described later is performed, and while the process concerning bookmark data is initiated, the Web browser processing is terminated in accordance with an instruction. The bookmark processing will be further described in detail while referring to FIG. 9.

Figure 9:
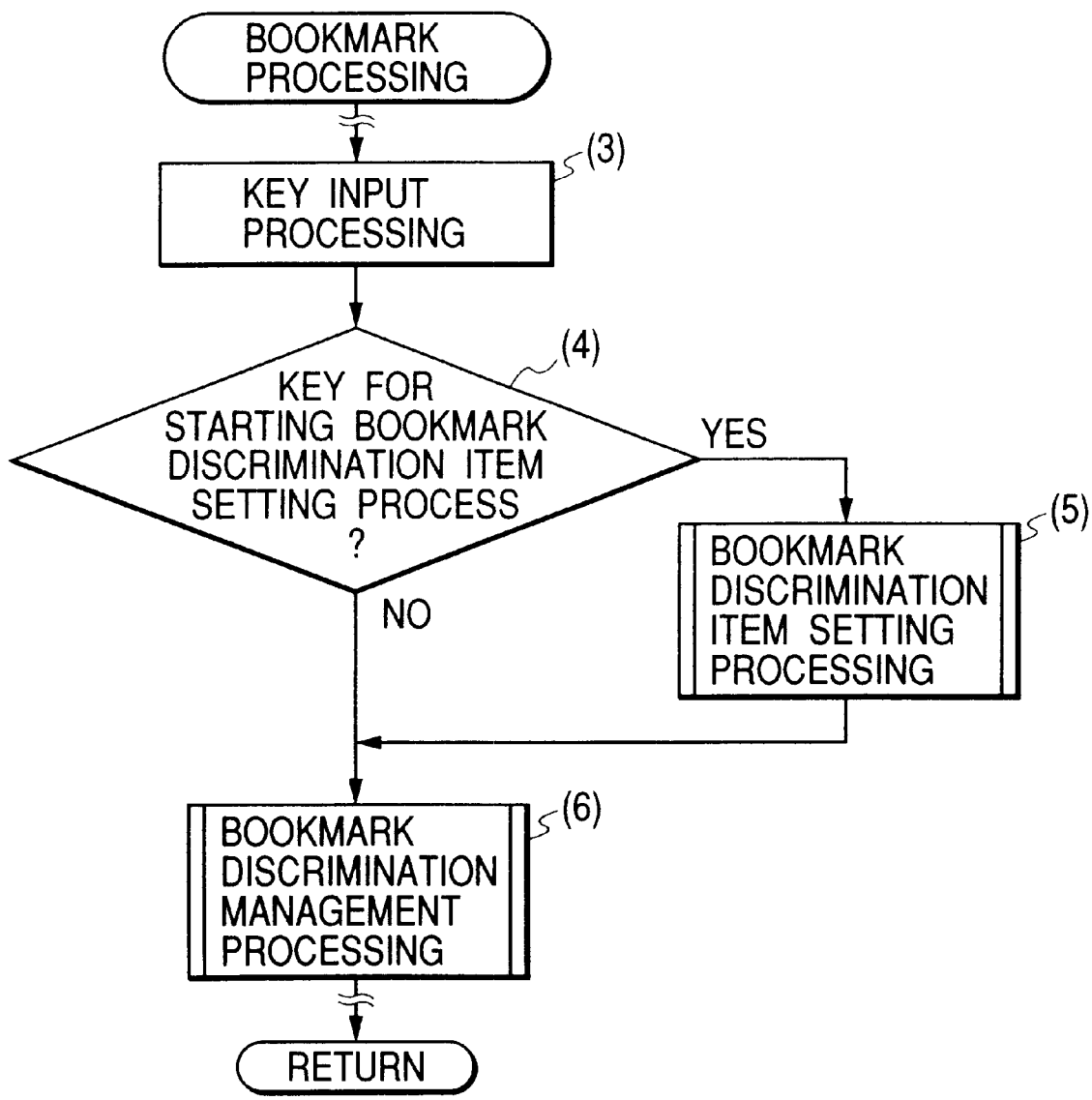
FIG. 9 is a flowchart showing the bookmark processing performed in FIG. 8.

FIG. 9 is a flowchart showing the bookmark processing performed at step (2) in FIG. 8. The numbers (3) to (6) denote processing steps.

At step (3) the key input processing is performed, and at step (4), a check is performed to determine whether the pertinent key is for beginning the bookmark discrimination item setting process. If the decision is YES, program control advances to step (5), whereat the bookmark discrimination item setting process is performed. Program control then goes to step (6).

If the decision at step (4) is NO, at step (6) the bookmark discrimination management processing is performed. Program control thereafter returns to the Web browser processing.

Figure 10:
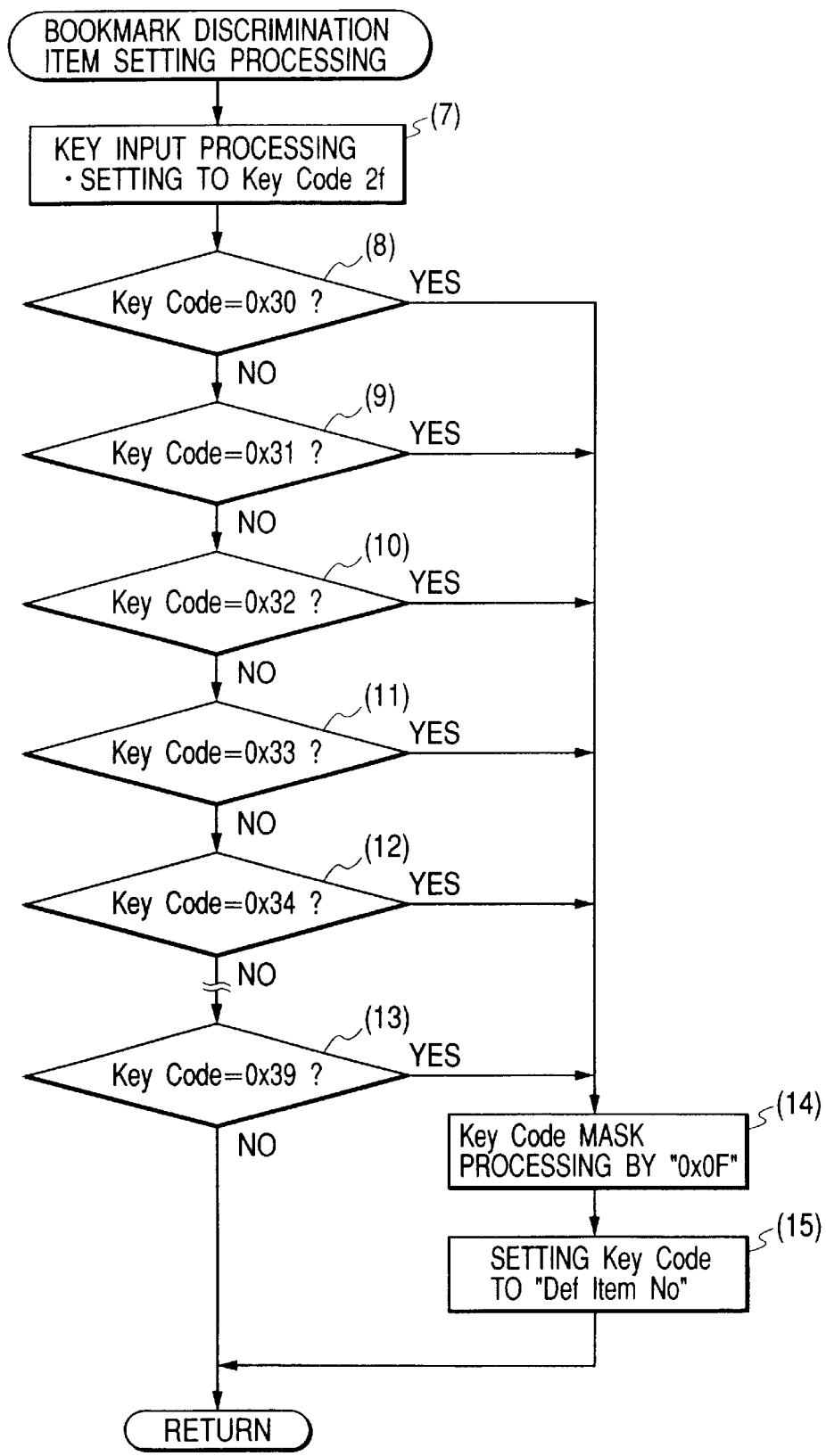
FIG. 10 is a flowchart showing the bookmark discrimination item setting processing performed in FIG. 9.
Figure 11:
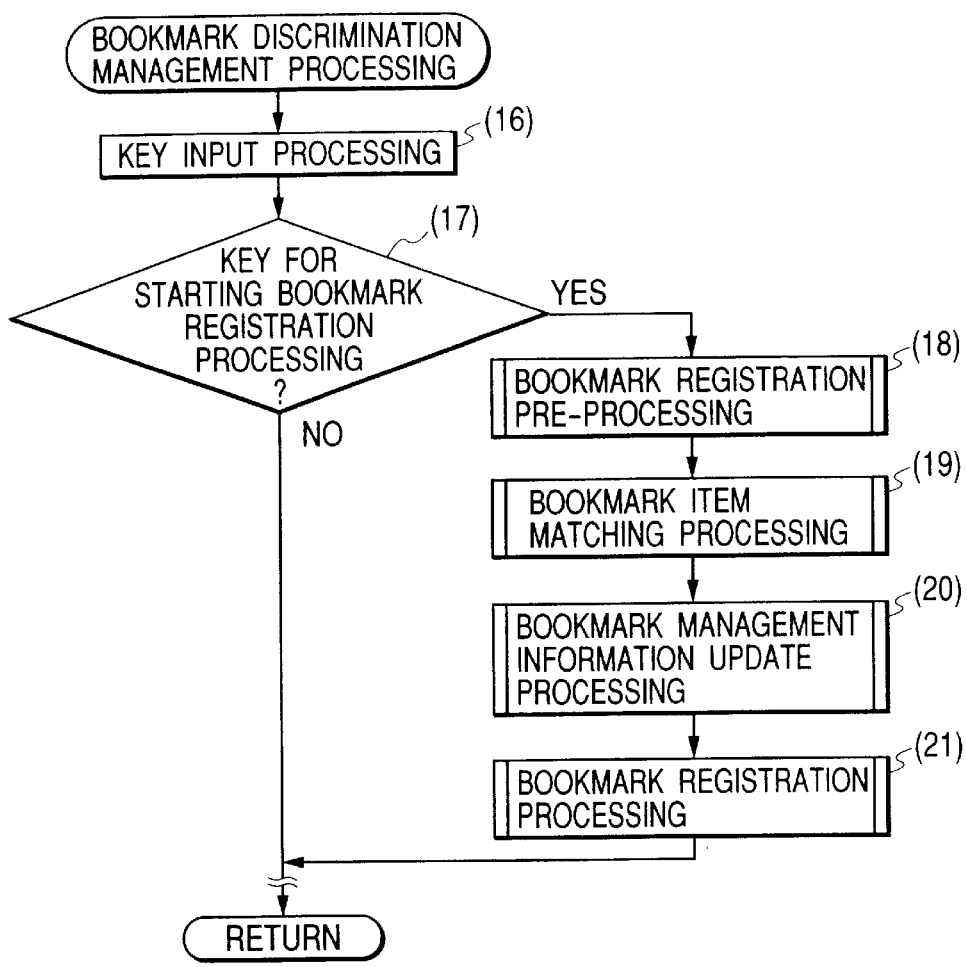
FIG. 11 is a flowchart showing the bookmark discrimination management processing performed in FIG. 9.

The bookmark discrimination item setting processing at step (5) and the bookmark discrimination management processing at step (6) will be further described in detail while referring to FIGS. 10 and 11.

FIG. 10 is a flowchart showing the bookmark discrimination item setting processing performed at step (5). The numbers (7) to (15) denote processing steps.

At step (7) the key input processing is performed in order to obtain an item number for discrimination of a bookmark, and the obtained key code is set in the Key Code area 2f. At steps (8) to (13), a check is performed to determine whether the key code in the Key Code area 2f corresponds to the individual items. That is, whether the key code is "0x30" is determined at step (8); whether the key code is "0x31" is determined at step (9); whether the key code is "0x32" is determined at step (10); whether the key code is "0x33" is determined at step (11); whether the key code is "0x34" is determined at step (12); and whether the key code is "0x39" is determined at step (13). When the decision at one of the steps is YES, at step (14), mask processing is performed for the Key Code 2f using "0x00", and at step (15), as a discrimination item number, the Key Code 2f is set as the defined item number (Def Item No) 2g and program control is returned to the bookmark processing (step (6)). When the decision at all of the steps (8) to (13) is NO, program control returns to the bookmark processing without a further process being performed.

FIG. 11 is a flowchart showing the bookmark discrimination management processing (step (6)) performed in FIG. 9. The numbers (16) to (21) denote processing steps.

At step (16) the key input processing is performed, and at step (17) a check is performed to determine whether the pertinent key is for starting the bookmark registration processing. If the decision is YES, the bookmark registration processing at step (18), the bookmark item matching processing at step (19), the bookmark management information update processing at step (20) and the bookmark registration processing at step (21) are performed. Thereafter, program control returns to the bookmark processing.

If the decision at step (17) is NO, a process corresponding to the input key, such as the display of information, is performed. Program control thereafter returns to the bookmark processing.

Since various processes that correspond to the input keys at step (17) and the following steps, and various bookmark management processes at step (21) and the following steps that are performed before program control returns to the bookmark processing are not required for this description of the embodiment of the invention, these processes are not shown in the flowcharts.

The bookmark registration pre-processing at step (18), the bookmark item matching processing at step (19), the bookmark management information update processing at step (20) and the bookmark registration processing at step (21) will be further described in detail while referring to FIGS. 12 to 19.

Figure 12:
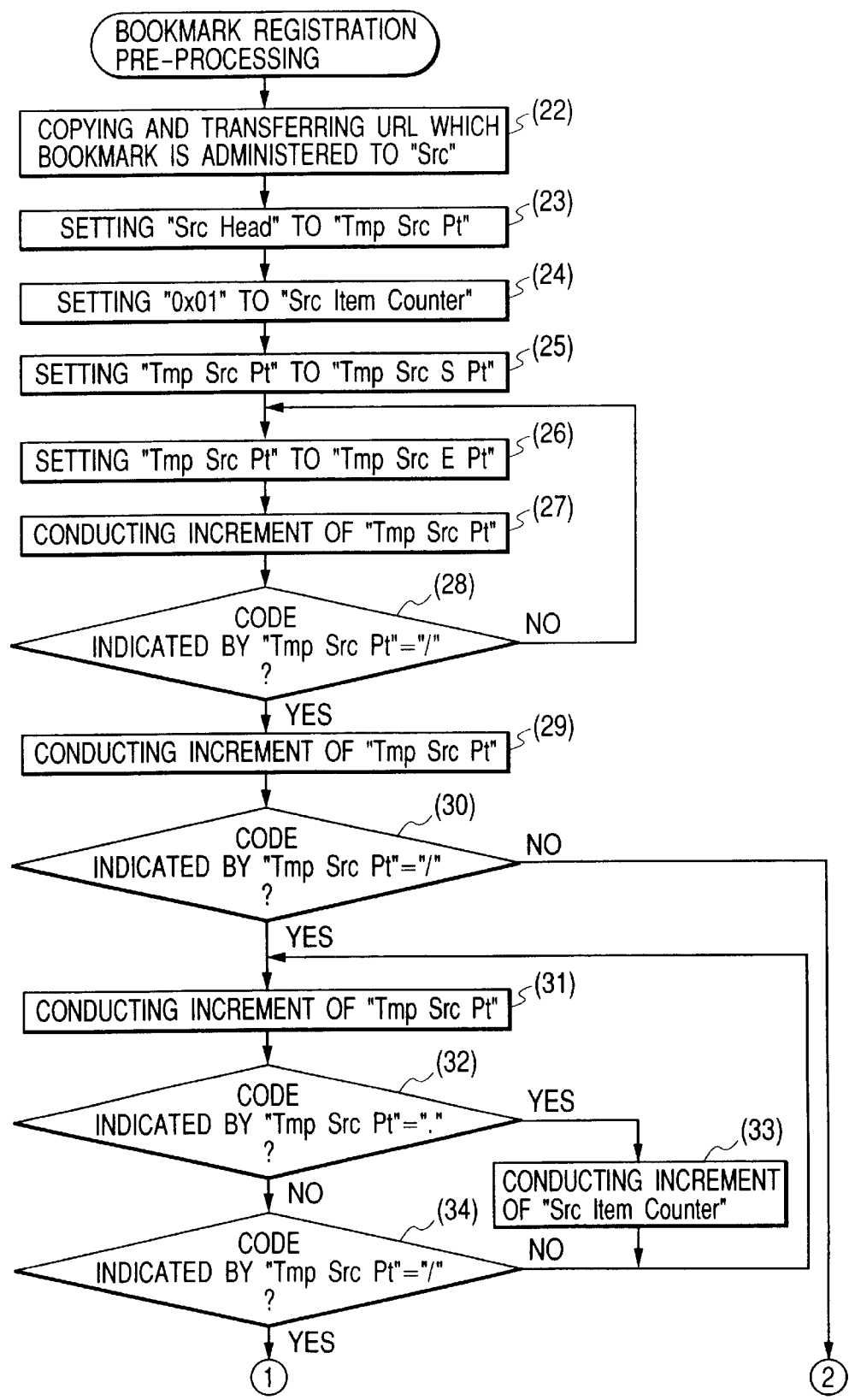
FIG. 12 is a flowchart showing the bookmark registration pre-processing performed in FIG. 11.
Figure 13:
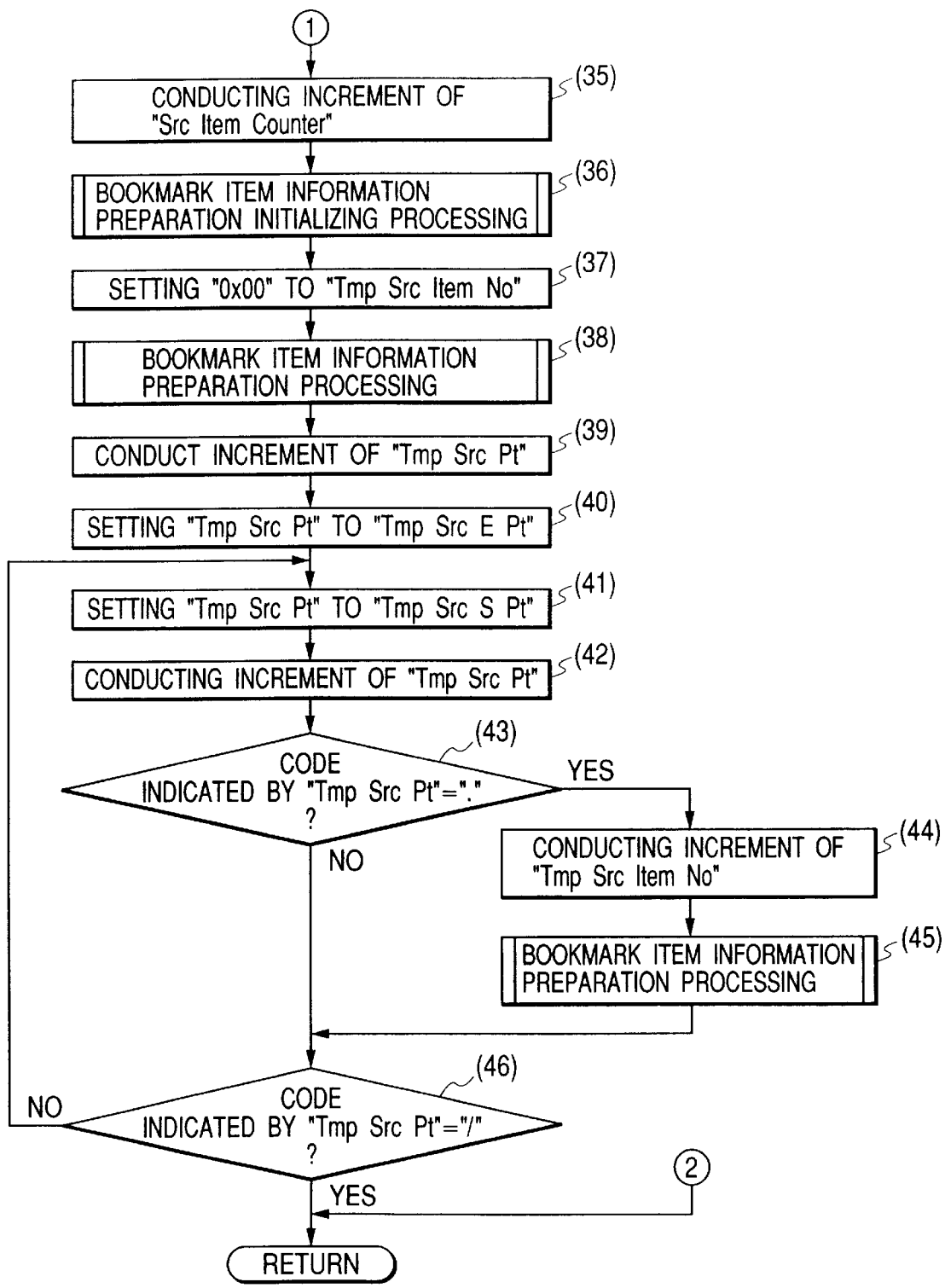
FIG. 13 is a flowchart showing the bookmark registration pre-processing performed in FIG. 11.

FIGS. 12 and 13 are flowcharts showing the bookmark registration pre-processing performed in FIG. 11. The numbers (22) to (46) denote processing steps.

At step (22) a URL for which a bookmark is being administered is copied and transmitted to the URL source hold area 2a, and at step (23) the Src Head is set to the temporary source pointer (Tmp Src Pt) 2i.

At step (24) "0x01" is set to the source item counter (Src Item counter) 2h, and at step (25) the temporary source pointer (Tmp Src Pt) 2i is set to the temporary source start pointer (Tmp Src SPt) 2j. At step (26) the temporary source pointer (Tmp Src Pt) 2i is set to the temporary end pointer (Tmp Src EPt) 2k, and at step (27) the temporary source pointer (Tmp Src Pt) 2i is incremented. Then, at step (28) a check is performed to determine whether code designated by the temporary source pointer (Tmp Src Pt) 2i is for a slash "/". If the decision is NO, program control returns to step (26), while if the decision is YES, program control advances to step (29).

At step (29) the temporary source pointer (Tmp Src Pt) 2i is incremented, and at step (30) a check is performed to determine whether the code designated by the temporary source pointer (Tmp Src Pt) 2i is for a slash "/". If the decision is NO, the bookmark registration pre-processing is terminated and program control returns to the bookmark discrimination management processing.

If the decision at step (30) is YES, however, program control advances to step (31), whereat the temporary source pointer (Tmp Src Pt) 2i is incremented.

At step (32) a check is performed to determine whether the code designated by the temporary source pointer (Tmp Src Pt) 2i is for a dot ".". If the decision is YES, program control advances to step (33), whereat the source item counter (Src Item Counter) 2h is incremented. Program control thereafter returns to step (31).

If the decision at step (32) is NO, however, program control goes to step (34), whereat a check is performed to determine whether the code designated by the temporary source pointer (Tmp Src Pt) 2i is for a slash "/". If the decision is NO, program control returns to step (31), while if the decision is YES, program control moves to step (35) in FIG. 13.

At step (35) the source item counter (Src Item Counter) 2h is incremented, and at step (36) the bookmark item information preparation initializing processing is performed to obtain the area for the source item table. At step (37) "0x00" is set as the temporary source item number (Tmp Src Item No) 2l, and at step (38) the bookmark item information preparation processing is performed. At step (39) the temporary source pointer (Tmp Src Pt) 2i is decremented, and at step (40) the temporary source pointer (Tmp Src Pt) 2i is set to the temporary source end pointer (Temp Src EPt) 2k. At step (41) the temporary source pointer (Tmp Src Pt) 2i is set to the temporary source start pointer (Tmp Src Spt) 2j, and at step (42) the temporary source pointer (Tmp Src Pt) 2i is decremented. At step (43) a check is performed to determine whether the code designated by the temporary source pointer (Tmp Src Pt) 2i is for a dot ".". If the decision is YES, program control advances to step (44), while if the decision is NO, program control goes to step (46).

At step (44) the temporary source item number (Tmp Src Item No) 2l is incremented, and at step (45) the bookmark item information preparation processing is performed. Program control then moves to step (46).

At step (46) a check is performed to determine whether the code designated by the temporary source pointer (Tmp Src Pt) 2i is for a slash "/". If the decision is NO, program control returns to step (41), while if the decision is YES, the bookmark registration pre-processing is terminated and program control returns to the bookmark discrimination management processing.

Figure 14:
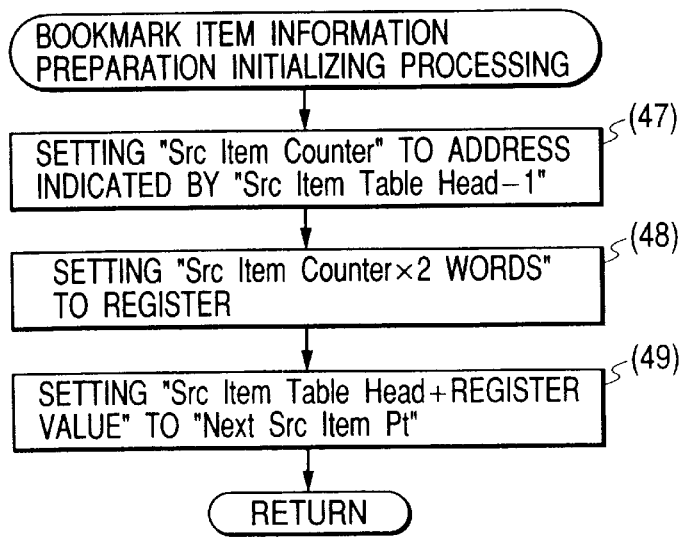
FIG. 14 is a flowchart showing the bookmark item information preparation initializing processing performed in FIG. 13.

The bookmark item information preparation initializing processing at step (36), and the bookmark item information preparation processing at step (38) will be further described in detail while referring to FIGS. 14 and 15.

FIG. 14 is a flowchart for the bookmark item information preparation initializing processing shown in FIG. 13. The numbers (47) to (49) denote processing steps.

At step (47) the source item counter (Src Item Counter) $2h$ is loaded into address Src Item Table Head-1, and at step (48) the source item counter (Src Item Counter) $2h \times 2$ words is loaded into the register. Then, at step (49) the Src Item Table Head+the register value is set to the next source item pointer (Next Src Item Pt) $2n$ and the processing is terminated, program control returning thereafter to the bookmark discrimination management processing.

FIG. 15 is a flowchart for the bookmark item information preparation processing performed at step (38) in FIG. 13. The numbers (50) to (57) denote processing steps.

At step (50) the temporary source item number (Tmp Src Item No) $2l \times 2$ words is loaded into the register, and at step (51) the next source item pointer (Next Src Item Pt) $2n$ is set to the address indicated by the Src Item Table Head+register value. At step (52) the contents at the address that is pointed to by the temporary source start pointer (Tmp Src SPt) $2j$ are loaded into the address pointed to by the next source item pointer (Next Src Item Pt) $2n$. At step (53) the next source item pointer (Next Src Item Pt) $2n$ is incremented, and at step (54) a check is performed to determine whether the temporary source start pointer (Tmp Src SPt) $2j$ equals the temporary source end pointer (Tmp Src Ept) $2k$. When the decision is NO, program control advances to step (55), whereat the temporary source start pointer (Tmp Src SPt) $2j$ is incremented. Program control thereafter returns to step (52).

When the decision at step (54) is YES, at step (56) "0x00" is loaded into the address pointed to by the next source item pointer (Next Src Item Pt) $2n$. Then, at step (57) the next source item pointer (Next Src Item Pt) $2n$ is incremented and the bookmark item information preparation processing is terminated. Program control thereafter returns to the bookmark discrimination management processing.

Figure 16:
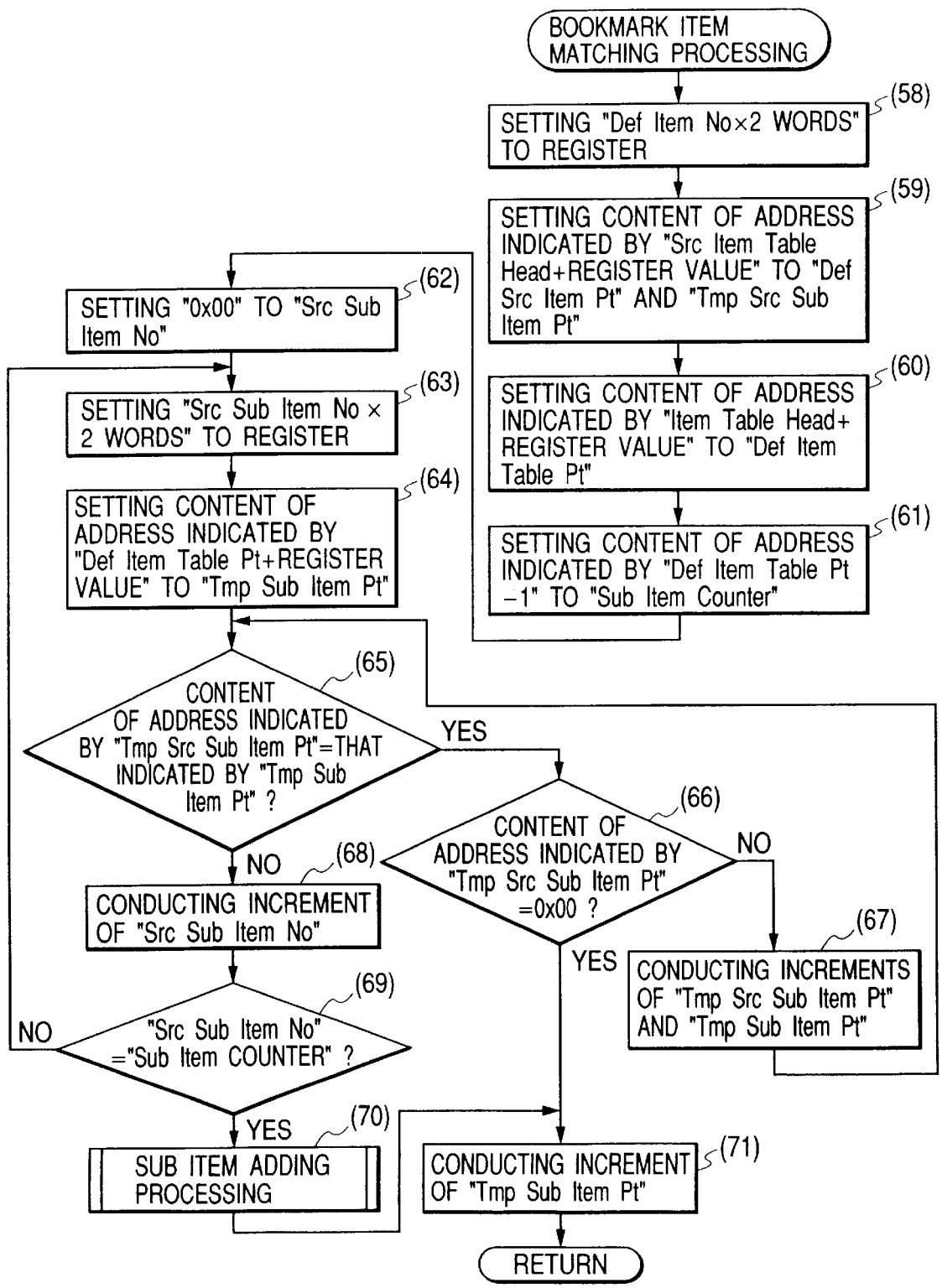
FIG. 16 is a flowchart showing the bookmark item matching processing performed in FIG. 11.

FIG. 16 is a flowchart showing the bookmark item matching processing at step (19) in FIG. 11. The numbers (58) to (71) denote processing steps.

At step (58) the defined item number (Def Item No) $2g \times 2$ words is loaded into the register. Then, at step (59) the contents of the address pointed to by the Src Item Table Head+the register value are set to the defined source item pointer (Def Src Item Pt) $2o$ and the temporary source sub-item pointer (Tmp Src Sub Item Pt) $2q$. At step (60) the contents of the address pointed to by the Item Table Head+register value are set to the defined item table pointer (Def Item Table Pt) $2s$, and at step (61) the contents of the address pointed to by the defined item table pointer (Def Item Table Pt-1) $2s-1$ are loaded into the sub-item counter (Sub Item Counter) $2m$. At step (62) "0x00" is set to the source sub-item number (Src Sub Item No) $2p$, and at step (63) the source sub-item number (Src Sub Item No) $2p \times 2$ words is loaded into the register. At step (64) the contents of the address pointed to by the defined item table pointer (Def Item Table Pt) $2s$+register value are set to the temporary sub-item pointer (Tmp Sub Item Pt) $2t$, and at step (65) a check is performed to determine whether the contents of the address pointed to by the temporary source sub-item pointer (Tmp Src Sub Item Pt) $2q$ equal the contents of the address pointed to by the temporary sub-item pointer (Tmp Sub Item Pt) $2t$. If the decision is NO, program control advances to step (68), while if the decision is YES, program control goes to step (66).

At step (68) the source sub-item number (Src Sub Item No) $2p$ is incremented, and at step (69) a check is performed to determine whether the source sub-item number (Src Sub Item No) $2p$ equals the sub-item counter (Sub Item Counter) $2m$. When the decision is NO, program control returns to step (63).

If the decision at step (69) is YES, however, it is assumed that a sub-item is new, and at step (70) the sub-item adding processing is performed. Then, at step (71) the temporary sub-item pointer (Tmp Sub Item Pt) $2t$ is incremented and the bookmark item matching processing is terminated. Program control thereafter returns to the bookmark discrimination management processing.

When the decision at step (65) is YES, at step (66) a check is performed to determine whether S"0x00" is stored at the address pointed to by the temporary source sub-item pointer (Tmp Src Sub Item Pt) $2q$. If the decision is YES, it is assumed that the items match, and program control advances to step (71), whereat the temporary sub-item pointer (Tmp Sub Item Pt) is incremented. The bookmark item matching processing is thereafter terminated and program control returns to the bookmark discrimination management processing.

If the decision at step (66) is NO, however, at step (67) the temporary source sub-item pointer (Tmp Src Sub Item Pt) $2q$ and the temporary sub-item pointer (Tmp Sub Item Pt) $2t$ are incremented. Program control then returns to step (65).

The sub-item adding processing at step (70) will now be described in more detail while referring to FIG. 17.

Figure 17:
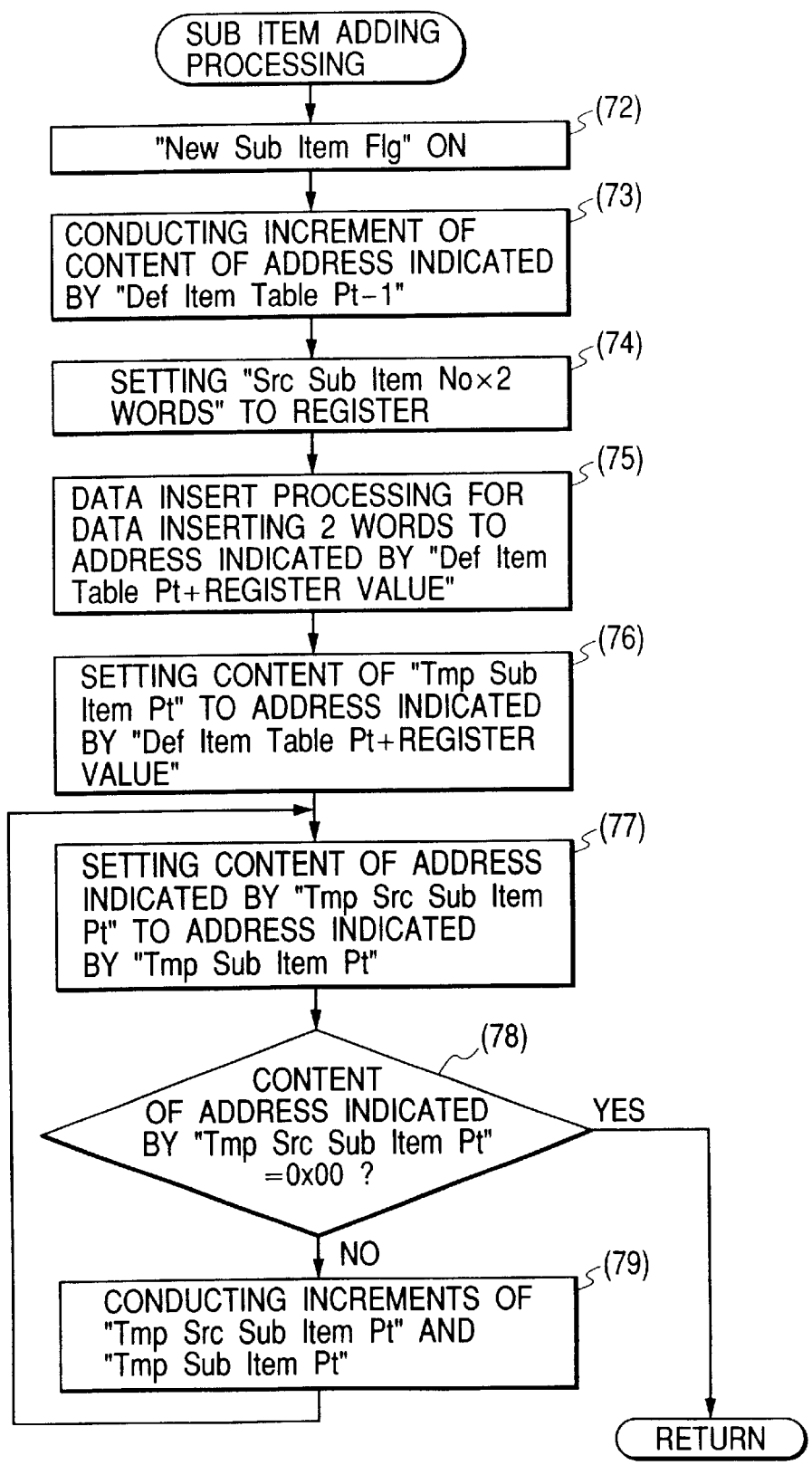
FIG. 17 is a flowchart showing the sub-item adding processing performed in FIG. 16.

FIG. 17 is a flowchart showing the sub-item adding processing performed in FIG. 16. The numbers (72) to (79) denote processing steps.

At step (72) the new sub-item flag (New Sub Item Flg) $2r$ is set to ON, and at step (73) the contents of the address pointed to by the defined item table pointer (Def Item Table Pt-1) $2s-1$ are incremented. At step (74) the source sub-item number (Src Sub Item No) $2p \times 2$ words is loaded into the register, and at step (75) two data words are loaded into the address pointed to by the defined item table pointer (Def Item Table Pt) $2s$+the register value.

At step (76) the contents pointed to by the temporary sub-item pointer (Tmp Sub Item Pt) $2t$ are loaded into the address pointed to by the defined item table pointer (Def Item Table Pt) $2s$+register value. At step (77) the contents stored at the address pointed to by the temporary source sub-item pointer (Tmp Src Sub Item Pt) $2q$ are loaded into the address pointed to by the temporary sub-item pointer (Tmp Sub Item Pt) $2t$. At step (78) a check is performed to determine whether "0x00" is stored at the address pointed to by the temporary source sub-item pointer (Tmp Src Sub Item Pt) $2q$. If the decision is NO, program control advances to step (79), and the temporary source sub-item pointer (Tmp Src Item Pt) $2q$ and the temporary sub-item pointer (Tmp Sub Item Pt) $2t$ are incremented. Program control thereafter returns to step (77).

When the decision at step (78) is YES, however, the processing is terminated, and program control returns to the bookmark discrimination management processing.

Figure 18:
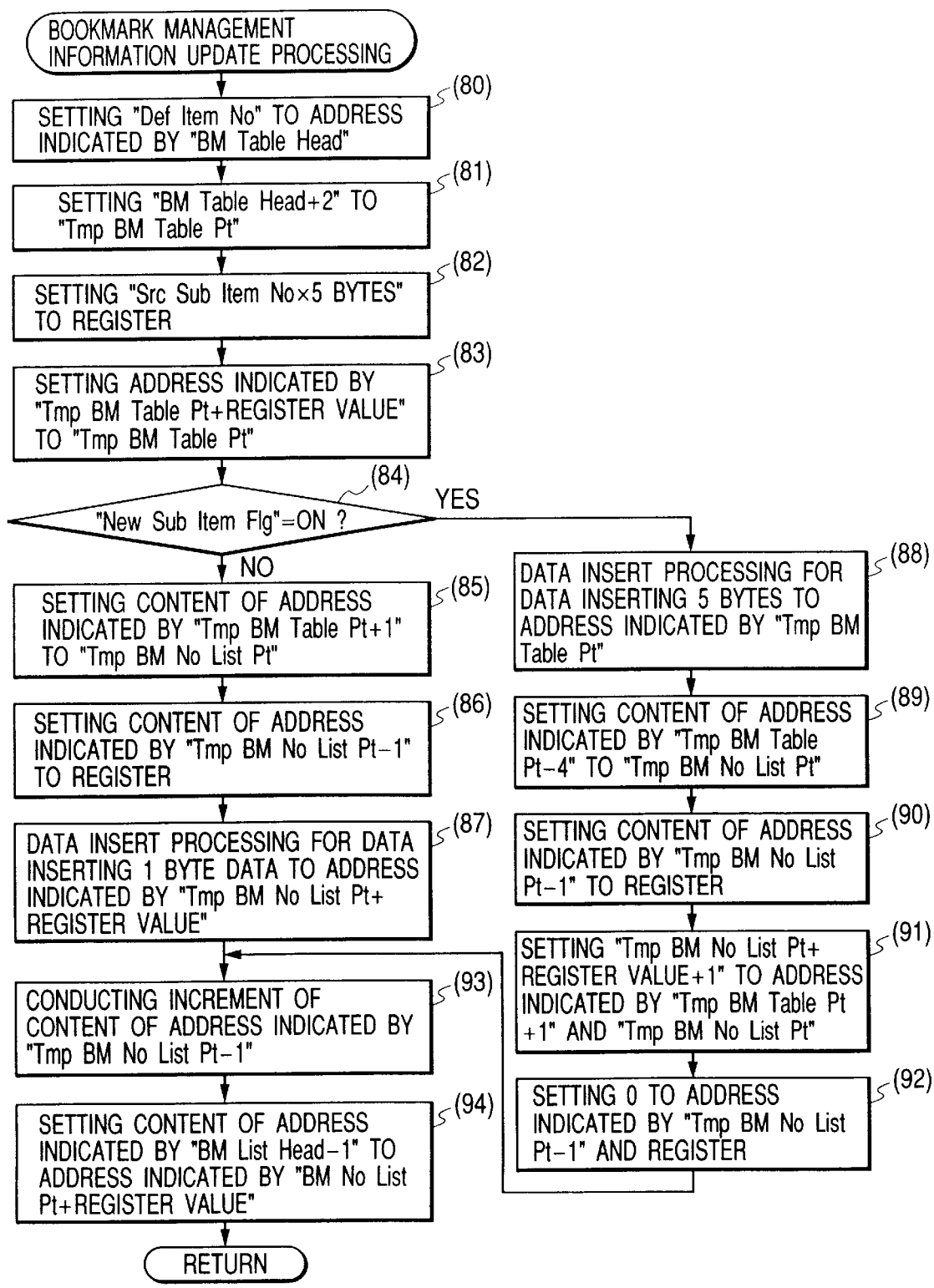
FIG. 18 is a flowchart showing the bookmark management information update processing performed in FIG. 11.

FIG. 18 is a flowchart showing the bookmark management information update processing performed in FIG. 11. The numbers (80) to (94) denote processing steps.

At step (80) the defined item number (Def Item No) 2g is set at the address of the BM Table Head, and at step (81) BM Table Head+2 is set to the temporary bookmark table pointer (Tmp BM Table Pt) 2u. At step (82) the source sub-item number (Src Sub Item No) 2p×5 bytes is loaded into the register. At step (83) the contents of the address pointed to by the temporary bookmark table pointer (Tmp BM Table Pt) 2u+register value are set to the temporary bookmark table pointer (Tmp BM Table Pt) 2u, and at step (84) a check is performed to determine whether the new sub-item flag (New Sub Item Flg) 2r is set to ON. If the decision is NO, program control advances to step (85), while if the decision is YES, program control goes to step (88).

When the decision at step (84) is NO, it is assumed that the sub-item is not new, and at step (85), the contents at the address pointed to by Tmp BM Table+1 are set to the temporary bookmark number list pointer (Tmp BM No List Pt) 2v. At step (86) the contents of the address pointed to by the temporary bookmark number list pointer (Tmp BM No List Pt−1) 2v−1 are loaded into the register, and at step (87) one byte of data is loaded into the address pointed to by the temporary bookmark number list pointer (Tmp BM No List Pt) 2v+register value.

When the decision at step (84) is YES, it is assumed that the sub-item is new, and at step (88) five bytes of data are loaded into the address pointed to by the temporary bookmark table pointer (Tmp BM Table PT) 2u. Then, at step (89) the contents of the address pointed to the temporary bookmark table pointer (Tmp BM Table Pt−4) 2u−4 are set to the temporary bookmark number list pointer (Tmp BM No List Pt) 2v, and at step (90) the contents of the address pointed to by the temporary bookmark number list pointer (Tmp BM No List Pt−1) 2v−1 are loaded into the register. At step (91) the temporary bookmark number list pointer (Tmp BM No List Pt) 2v+register value+1 is loaded into the address pointed to by the temporary bookmark table pointer (Tmp BM Table Pt+1) 2u+1, and into the address pointed to by the temporary bookmark number list pointer (Tmp BM No list Pt) 2v. Following which, at step (92), a value of 0 is loaded into the address pointed to by the temporary bookmark number list pointer (Tmp BM No List Pt−1) 2u−1 and into the register.

At step (93) the contents of the address pointed to by the temporary bookmark number list pointer (Tmp BM No List Pt−1) 28-1 are incremented, and at step (94) the contents of the address pointed to by BM List Head-1 are loaded into the address pointed to by the temporary bookmark list pointer (Tmp BM List Pt) 2w=register value. The bookmark management information update processing is thereafter terminated, and program control returns to the bookmark discrimination management processing.

Figure 19:
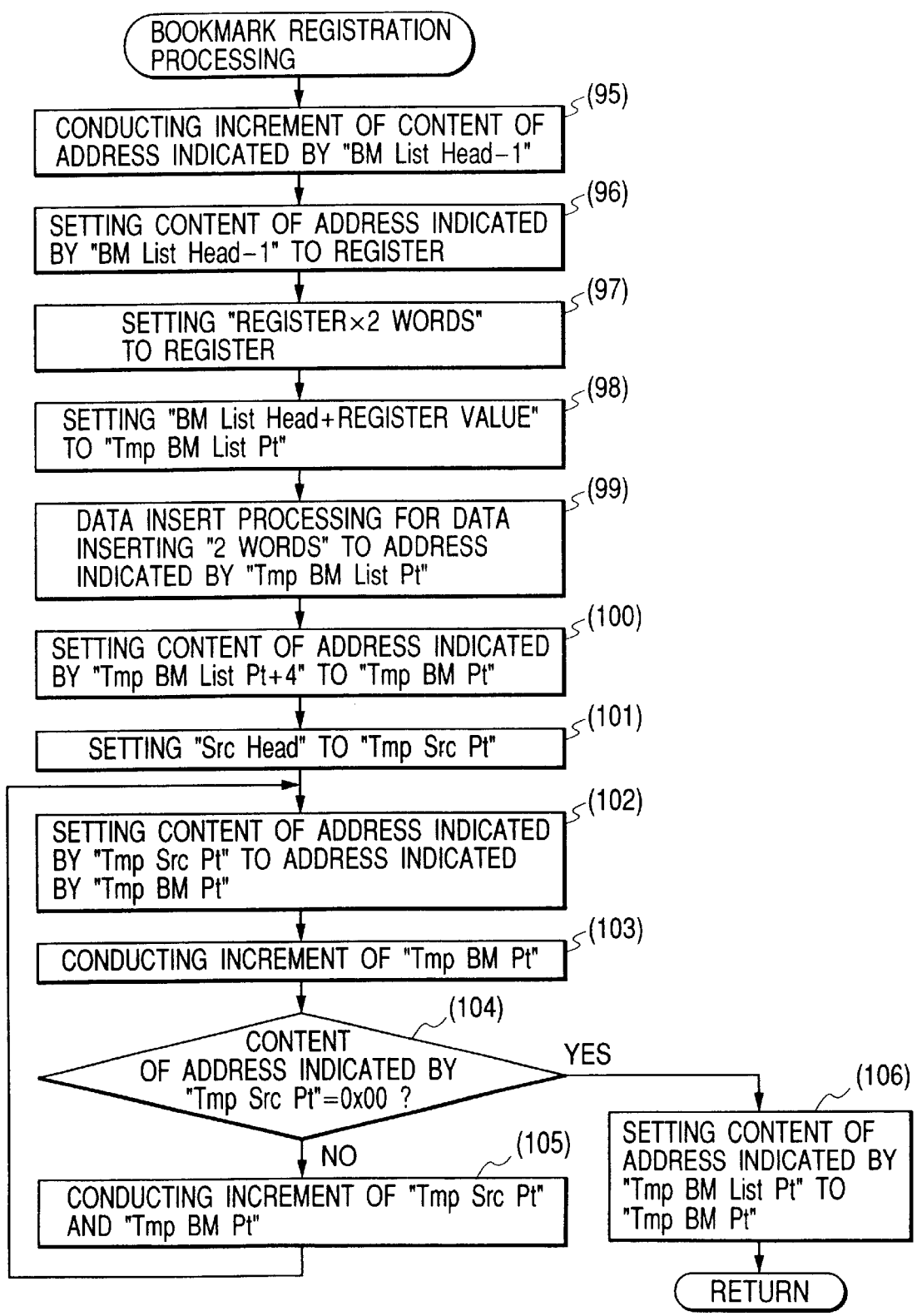
FIG. 19 is a flowchart showing the bookmark registration processing performed in FIG. 11.

FIG. 19 is a flowchart showing the bookmark registration processing performed in FIG. 11. The numbers (95) to (106) denote processing steps.

At step (95) the contents of the address pointed to by BM List Head-1 are incremented, and at step (96) the contents of the address BM List Head-1 are loaded into the register. At step (97) the register×2 words are loaded into the register, and at step (98) the BM List Head+register value is set to the temporary bookmark list pointer (Tmp BM List Pt) 2w. At step (99) two words of data are loaded into the address pointed to by the temporary bookmark list pointer (Tmp BM List Pt) 2w, while at step (100) the contents of the address pointed to by the temporary bookmark list pointer (Tmp BM List Pt4) 2w−4 are set to the temporary bookmark pointer (Tmp BM Pt) 2x. At step (101) Src Head is set to the temporary source pointer (Tmp Src Pt) 2i, and at step (102), the contents of the address pointed to by the temporary source pointer (Tmp Src Pt) 2i are loaded into the address pointed to by the temporary bookmark pointer (Tmp BM Pt) 2x. At step (103) the temporary bookmark pointer (Tmp BM Pt) 2x is incremented, and at step (104) a check is performed to determine whether "0×00" is stored at the address pointed to by the temporary source pointer (Tmp Src Pt) 2i. If the decision is NO, program control goes to step (105), while if the decision is YES, program control moves to step (106).

When the decision at step (104) is NO, at step (105), the temporary source pointer (Tmp Src Pt) 2i and the temporary bookmark pointer (Tmp Bm Pt) 2x are incremented. Program control then returns to step (102).

But when the decision at step (104) is YES, at step (106) the temporary bookmark pointer (Tmp BM Pt) 2x is loaded into the address pointed to by the temporary bookmark list pointer (Tmp BM List Pt) 2x. Then, the bookmark registration processing is terminated, and program control advances to the bookmark discrimination management processing.

In the above embodiment, the procedures performed by the Web browser program 1a, the bookmark discrimination item setting program 1b and the bookmark discrimination management program 1c are stored in the ROM; however, these programs may be stored in the internal memory 3. In other words, so long as the programs can be controlled by the CPU 5, they may be stored in any type of memory.

Furthermore, in the above embodiment, a number that corresponds to the key code obtained from the keyboard 4 is employed to set the item for the bookmark discrimination item setting program 1b. However, so long as the setting process can be performed, another method may be employed. For example, a method may be employed where a URL is displayed on a panel and a user can designate a desired discrimination item location in the URL by touching the panel.

In addition, a different type of item number need not necessarily be employed for allocation for items that represent a directory or reference information. The number following the number that was allocated for the item representing the domain name may be employed.

Further, although in the above embodiment only one target item number was selected to discriminate between the bookmark data, a plurality of target item numbers may be selected. In this case, priority is given to the target item numbers, and bookmark data are discriminated between based on the target item number having the highest priority. If the sub-items are the same for the target item number, the bookmark data are discriminated between based on the item number having the second highest priority. In this manner, since the priority order of a target item number is changed, a more detailed discrimination of bookmark data can be performed.

The target item number order allocated in the above embodiment may be employed to select a plurality of target item numbers. In this case, systematic discrimination, such as discrimination based on each protocol, on each country, or on each organization, can be easily applied.

Moreover, while in the above embodiment, when a URL has been is registered as a bookmark, the bookmark data are discriminated between and registered, the registration method is not thereby limited. When a target item number has been set, the bookmark data that have already been entered in the bookmark list may be re-registered in the bookmark list based on the target item number.

Furthermore, in the above embodiment, the items are regarded as the elements that constitute the protocol name of the URL and the domain names. However, the protocol name of the URL and the domain names may be regarded as genres and channel numbers for a web television (Web TV), even though the number of items differs.

In the above embodiment, when the target item number used for discrimination is set in advance, bookmarks added to the bookmark data are automatically discriminated between and managed in accordance with the designated item number. Therefore, the management of bookmarks wherefor data are not simply arranged, and the management of bookmarks wherefor for discrimination the designation of a target item number is performed in accordance with a user's desires can be provided.

An explanation will now be given, while referring to a memory map in FIG. 20, for the structure of a data processing program that can be read by the information processing apparatus of this invention.

FIG. 20 is a diagram for explaining the memory map of a storage medium, which can be read by the information processing apparatus of this invention, on which various data processing programs are stored.

It should be noted that, although not specifically shown, information for managing program groups stored on a storage medium, such as version information and creator information, are also stored, and that information peculiar to an OS that controls the reading of a program, i.e., icons for identifying programs, may also be stored.

In addition, data associated with various programs are also managed in the directory. And a program for installing programs on a computer, and a program for decompressing a program before it is installed may also be stored.

The programs corresponding to the flowcharts in FIGS. 8 to 19 in this embodiment may be installed and executed by a host computer. In this case, the present invention can be applied for a case wherein information groups, including programs, are supplied from a storage medium, such as a CD-ROM, a flash memory or an FD, or an external storage medium via a network, to an output device.

The objective of the present invention can also be implemented in the following manner: a storage medium on which is recorded software program code for implementing the functions of the above embodiment is loaded into a computer (a CPU or an MPU), part of a system or of an apparatus, and the program code stored on the storage medium is read by the computer in the system or the apparatus.

A storage medium for supplying such program code can be, for example, a floppy disk, a hard disk, an optical disk, a magneto-optical disk, a CD-ROM, a CD-R, a DVD, a magnetic tape, a nonvolatile memory card, a ROM, or a EEPROM.

In addition, the present invention includes not only a case wherein the functions in the previous embodiment can be performed when program code is read and executed by the computer, but also a case wherein, in accordance with an instruction in program code, in an OS (Operating System) running on the computer, or in another software application, the computer interacts with the program code to accomplish the functions in the above embodiment.

Furthermore, the present invention includes a case wherein program code, read from a storage medium, is written in a memory that is mounted on a function expansion board inserted into a computer, or in a function expansion unit connected to a computer, and in consonance with a program code instruction, a CPU mounted on the function expansion board or the function expansion unit performs a part, or all of the actual processing in order to implement the functions in the above described embodiment.

What is claimed is:

1. An information processing apparatus, for managing a bookmark list in which URL information is registered that is used to access other information processing apparatuses in order to obtain desired information, comprising:
   division means for dividing URL information into a plurality of items;
   item number assignment means for assigning item numbers based on locations of said items in said URL information; and
   registration means for discriminating between said URL information based on a desired item number, and for registering said URL information in said bookmark list.

2. An information processing apparatus according to claim 1, further comprising: storage means for storing, for each of said item numbers, sub-items that represent the type of the assigned item.

3. An information processing apparatus according to claim 1, wherein, for items that represent domain names, said item number assignment means assigns item numbers starting at the last item.

4. An information processing apparatus according to claim 1, wherein, when an instruction is issued for the registration of new URL information in said bookmark list, said division means divides said new URL information into a plurality of items, said item number assignment means assigns item numbers based on the locations of said obtained items in said new URL information, and in accordance with a target item number, said registration means discriminates between and registers said new URL information in said bookmark list.

5. An information processing apparatus according to claim 1, further comprising setting means for setting a target item number.

6. An information processing apparatus according to claim 5, wherein said setting means is capable of setting a plurality of target item numbers.

7. An information processing apparatus according to one of claims 1 to 3, wherein said registration means employs an item number in consonance with the order of said numbers assigned by said item number assignment means, to identify and to register said URL information in said bookmark list.

8. An information processing apparatus according to claim 5, wherein, when a target item number is set by said setting means, said division means divides, into a plurality of items, said URL information registered in said bookmark list, said item number assignment means assigns item numbers based on the locations in said URL information of the obtained items, and said registration means employs a target item number to discriminate between said URL information and to re-register said URL information in said bookmark list.

9. An information processing apparatus according to claim 1, wherein said items are a protocol name and domain names.

10. An information processing apparatus according to claim 9, wherein said items include directory names.

11. An information processing apparatus according to claim 1, wherein said items are character strings delimited by a slash "/" and a dot "." in said URL information.

12. An information processing apparatus according to claim 1, wherein said items are genres and channel numbers for Web television.

13. An information processing method, for managing a bookmark list in which URL information is registered that is used to access other information processing apparatuses in order to obtain desired information, comprising:

a division step of dividing URL information into a plurality of items;

an item number assignment step of assigning item numbers based on locations of said items in said URL information; and a registration step of discriminating between said URL information based on a desired item number, and of registering said URL information in said bookmark list.

14. An information processing method according to claim 13, further comprising: a storage step of storing, for each of said item numbers, sub-items that represent the type of the assigned item.

15. An information processing method according to claim 13, wherein, at said item number assignment step, for items that represent domain names, item numbers are assigned starting at the last item.

16. An information processing method according to claim 13, wherein, when an instruction is issued for the registration of new URL information in said bookmark list, at said division step, said new URL information is divided into a plurality of items, at said item number assignment step, item numbers are assigned based on the locations of said obtained items in said new URL information, and at said registration step, said new URL information is discriminated between and is registered in said bookmark list in accordance with a target item number.

17. An information processing method according to claim 13, further comprising a setting step of setting a target item number.

18. An information processing method according to claim 17, wherein a plurality of target item numbers are capable of being set at said setting step.

19. An information processing method according to one of claims 13 to 15, wherein, at said registration step, an item number is employed in consonance with the order of said numbers assigned at said item number assignment step, to identify and to register said URL information in said bookmark list.

20. An information processing method according to claim 17, wherein, when a target item number is set at said setting step, at said division step, said URL information registered in said bookmark list is divided into a plurality of items, at said item number assignment step, item numbers are assigned based on the locations in said URL information of the obtained items, and at said registration step, a target item number is employed to discriminate between said URL information and to re-register said URL information in said bookmark list.

21. An information processing method according to claim 13, wherein said items are a protocol name and domain names.

22. An information processing method according to claim 21, wherein said items include directory names.

23. An information processing method according to claim 13, wherein said items are character strings delimited by a slash "/" and a dot "." in said URL information.

24. An information processing method according to claim 13, wherein said items are genres and channel numbers for Web television.

25. A computer-readable storage medium on which an information processing program is stored to manage a bookmark list in which URL information is registered that is used to access other information processing apparatuses in order to obtain desired information, said information processing program comprising:

a division step of dividing URL information into a plurality of items;

an item number assignment step of assigning item numbers based on locations of said items in said URL information; and a registration step of discriminating between said URL information based on a desired item number, and of registering said URL information in said bookmark list.

26. A computer-readable storage medium according to claim 25, wherein said information processing program further comprises: a storage step of storing, for each of said item numbers, sub-items that represent the type of the assigned item.

27. A computer-readable storage medium according to claim 25, wherein, at said item number assignment step, for items that represent domain names, item numbers are assigned starting at the last item.

28. A computer-readable storage medium according to claim 25, wherein, when an instruction is issued for the registration of new URL information in said bookmark list, at said division step, said new URL information is divided into a plurality of items, at said item number assignment step, item numbers are assigned based on the locations of said obtained items in said new URL information, and at said registration step, said new URL information is discriminated between and is registered in said bookmark list in accordance with a target item number.

29. A computer-readable storage medium according to claim 25, wherein said information processing program further comprises a setting step of setting a target item number.

30. A computer-readable storage medium according to claim 29, wherein a plurality of target item numbers are capable of being set at said setting step.

31. A computer-readable storage medium according to one of claims 25 to 27, wherein, at said registration step, an item number is employed in consonance with the order of said numbers assigned at said item number assignment step, to identify and to register said URL information in said bookmark list.

32. A computer-readable storage medium according to claim 29, wherein, when a target item number is set at said setting step, at said division step, said URL information registered in said bookmark list is divided into a plurality of items, at said item number assignment step, item numbers are assigned based on the locations in said URL information of the obtained items, and at said registration step, a target item number is employed to discriminate between said URL information and to re-register said URL information in said bookmark list.

33. A computer-readable storage medium according to claim 25, wherein said items are a protocol name and domain names.

34. A computer-readable storage medium according to claim 33, wherein said items include directory names.

35. A computer-readable storage medium according to claim 25, wherein said items are character strings delimited by a slash "/" and a dot "." in said URL information.

36. A computer-readable storage medium according to claim 25, wherein said items are genres and channel numbers for Web television.

* * * * *